(12) United States Patent
McDonald et al.

(10) Patent No.: US 10,372,982 B2
(45) Date of Patent: Aug. 6, 2019

(54) METHODS AND APPARATUS FOR REPETITIVE IRIS RECOGNITION

(71) Applicant: EyeLock LLC, New York, NY (US)

(72) Inventors: David McDonald, Merrimack, NH (US); Daniel Sanchez, Brooklyn, NY (US); George Herbert Needham Riddle, Princeton, NJ (US)

(73) Assignee: Eyelock LLC, New York, NY (US)

( * ) Notice: Subject to any disclaimer, the term of this patent is extended or adjusted under 35 U.S.C. 154(b) by 83 days.

(21) Appl. No.: 15/109,706

(22) PCT Filed: Jan. 6, 2015

(86) PCT No.: PCT/US2015/010293
§ 371 (c)(1),
(2) Date: Jul. 5, 2016

(87) PCT Pub. No.: WO2015/103595
PCT Pub. Date: Jul. 9, 2015

(65) Prior Publication Data
US 2016/0350594 A1  Dec. 1, 2016

Related U.S. Application Data

(60) Provisional application No. 61/924,055, filed on Jan. 6, 2014, provisional application No. 62/056,598, filed on (Continued)

(51) Int. Cl.
*H04N 5/225* (2006.01)
*G06K 9/00* (2006.01)
*H04N 5/33* (2006.01)

(52) U.S. Cl.
CPC ....... *G06K 9/00604* (2013.01); *H04N 5/2256* (2013.01); *H04N 5/33* (2013.01)

(58) Field of Classification Search
CPC ..... G06K 9/00604; H04N 5/2256; H04N 5/33
(Continued)

(56) References Cited

U.S. PATENT DOCUMENTS 4,641,349 A   2/1987  Flom et al.
5,259,040 A   11/1993 Hanna
(Continued)

FOREIGN PATENT DOCUMENTS

EP   1 152 365 A2   7/2001
EP   1 152 365      11/2001
(Continued)

OTHER PUBLICATIONS

Supplementary Partial European Search Report on PCT/US2015010293 dated Jul. 25, 2017.
(Continued)

*Primary Examiner* — Zaihan Jiang
(74) *Attorney, Agent, or Firm* — Foley & Lardner LLP

(57) ABSTRACT

The methods and apparatus for repetitive iris recognition include an apparatus for repetitively imaging an iris. The apparatus comprises a housing defining a substantially planar outer surface, a first axis normal to the substantially planar outer surface, and a curved outer surface, opposite the substantially planar outer surface, defined by a curve rotated about the first axis. The apparatus further comprises an infrared sensor array, disposed within the housing, to acquire an infrared image of an iris via at least one first aperture in the substantially planar outer surface. The apparatus further comprises at least one infrared illuminator, disposed within the housing, to illuminate the iris during acquisition of the infrared image of the iris via at least one second aperture in the substantially planar outer surface.

12 Claims, 39 Drawing Sheets

Related U.S. Application Data on Sep. 28, 2014, provisional application No. 62/056,600, filed on Sep. 28, 2014.

(58) Field of Classification Search
USPC .......................................................... 348/78
See application file for complete search history.

(56) References Cited

U.S. PATENT DOCUMENTS

| | | |
|---|---|---|
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 2005/0084137 A1 | 4/2005 | Kim et al. |
| 2006/0074986 A1 | 4/2006 | Mallalieu et al. |
| 2007/0211922 A1 | 9/2007 | Crowley et al. |
| 2008/0086206 A1* | 4/2008 | Nasiatka ............... A61F 9/08 623/6.14 |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2010/0021016 A1 | 1/2010 | Cottard et al. |
| 2010/0021017 A1* | 1/2010 | Bell ............... G06K 9/00604 382/117 |
| 2010/0074477 A1 | 3/2010 | Fujii et al. |
| 2010/0110275 A1 | 5/2010 | Mathieu |
| 2010/0110374 A1* | 5/2010 | Raguin ............ G06K 9/0061 351/206 |
| 2010/0127826 A1 | 5/2010 | Saliba et al. |
| 2010/0183199 A1 | 7/2010 | Smith et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0158486 A1 | 6/2011 | Bringer et al. |
| 2011/0194738 A1 | 8/2011 | Choi et al. |
| 2011/0277518 A1 | 11/2011 | Lais et al. |
| 2012/0026383 A1* | 2/2012 | Odagaki ............... G03B 17/17 348/340 |
| 2012/0212597 A1* | 8/2012 | Hanna ............. G06K 9/00604 348/78 |
| 2012/0240223 A1 | 9/2012 | Tu |
| 2012/0242820 A1* | 9/2012 | Hanna ............. G06K 9/00221 348/78 |
| 2012/0257797 A1 | 10/2012 | Leyvand et al. |
| 2013/0088583 A1 | 4/2013 | Northcott et al. |
| 2013/0103014 A1* | 4/2013 | Gooding ............... A61B 3/102 606/6 |
| 2013/0162799 A1 | 6/2013 | Hanna et al. |
| 2013/0208103 A1* | 8/2013 | Sands ............... G06F 21/31 348/78 |
| 2015/0098630 A1* | 4/2015 | Perna ............. G06K 9/00604 382/117 |
| 2015/0196203 A1* | 7/2015 | Abreu .................. A61B 5/01 600/409 |
| 2015/0289762 A1* | 10/2015 | Popovich ........... G02B 27/0093 351/209 |
| 2017/0224533 A1* | 8/2017 | Gooding ............... A61F 9/009 |

FOREIGN PATENT DOCUMENTS

| | | |
|---|---|---|
| WO | WO-2010/062371 | 6/2010 |
| WO | WO-2011/093538 | 8/2011 |

OTHER PUBLICATIONS

B. Galvin, et al., Recovering Motion Fields: An Evaluation of Eight Optical Flow Algorithms, Proc. of the British Machine Vision Conf. (1998).

International Search Report & Written Opinion on PCT/US2015/010293 dated Apr. 22, 2015.

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

R. Kumar, et al., Direct recovery of shape from multiple views: a parallax based approach, 12th IAPR Int'l Conf. on Pattern Recognition (1994).

\* cited by examiner

| Device Status / User Experience | Step 1: Device on Table | Step 2: Device on Table and Gripped by User | Step 3: Device in Hand and Facing User | Step 4: Device finely-oriented and brought close to the user |
|---|---|---|---|---|
| A) User's experience relating to: Hand/Eye Coordination | A)<br>Device appears in similar 3D orientation from use-to-use, specifically:<br>• Hand-hold area appears upwards facing user from use-to-use<br>• No precise orientation in plane of table required for physical hand/device pick-up process.<br>• Coarse alignment to prevent gross errors in picking up the device. | B)<br>Device is comfortable and stable to hold and pick-up even after repeated use, specifically:<br>• No nudge or rotate manipulation required during device pick-up to compensate for variations in device 3D orientation<br>• Fingers are splayed laterally in neutral positions and not stretched<br>• Contact pressure and grip on fingers and palm are equally distributed with no extreme pressure on any one point<br>• Angle of wrist (hand to forearm angle) is close to neutral (180 degree) | B)<br>Device is comfortable to orient towards user, specifically:<br>• Rotation of device so optical components face user is spread over complete length of forearm, avoiding locally high-angle twists at wrist or fingers | A)<br>Device provides visual cues to orientate towards user, specifically:<br>• Non-rotationally symmetric visual cues that indicate a vertical orientation to the user<br>• Mirror on device indicating at least left and right eyes of user<br>B)<br>Device is comfortable to orient towards user, specifically:<br>• Slight rotation of the wrist in the plane of the device to compensate for lack of precise orientation in Step 1 performed by small wrist rotation about the neutral position in the plane of the device<br>• Slight rotation of the wrist about its neutral position to pitch and tilt the device to center left and right eyes with device<br>• Slight flex of elbow to bring device closer within operating range of the user<br>B)<br>Heat generated by the device does not make the device unexpectedly warm to pick up and hold<br>B)<br>Device has minimal usage error that would negatively impact performance, specifically:<br>• Fingers away from illuminators |
| B) User's experience relating to: Finger, Palm, Wrist, Forearm, Elbow Position and Motion | | | | |

Figure 3

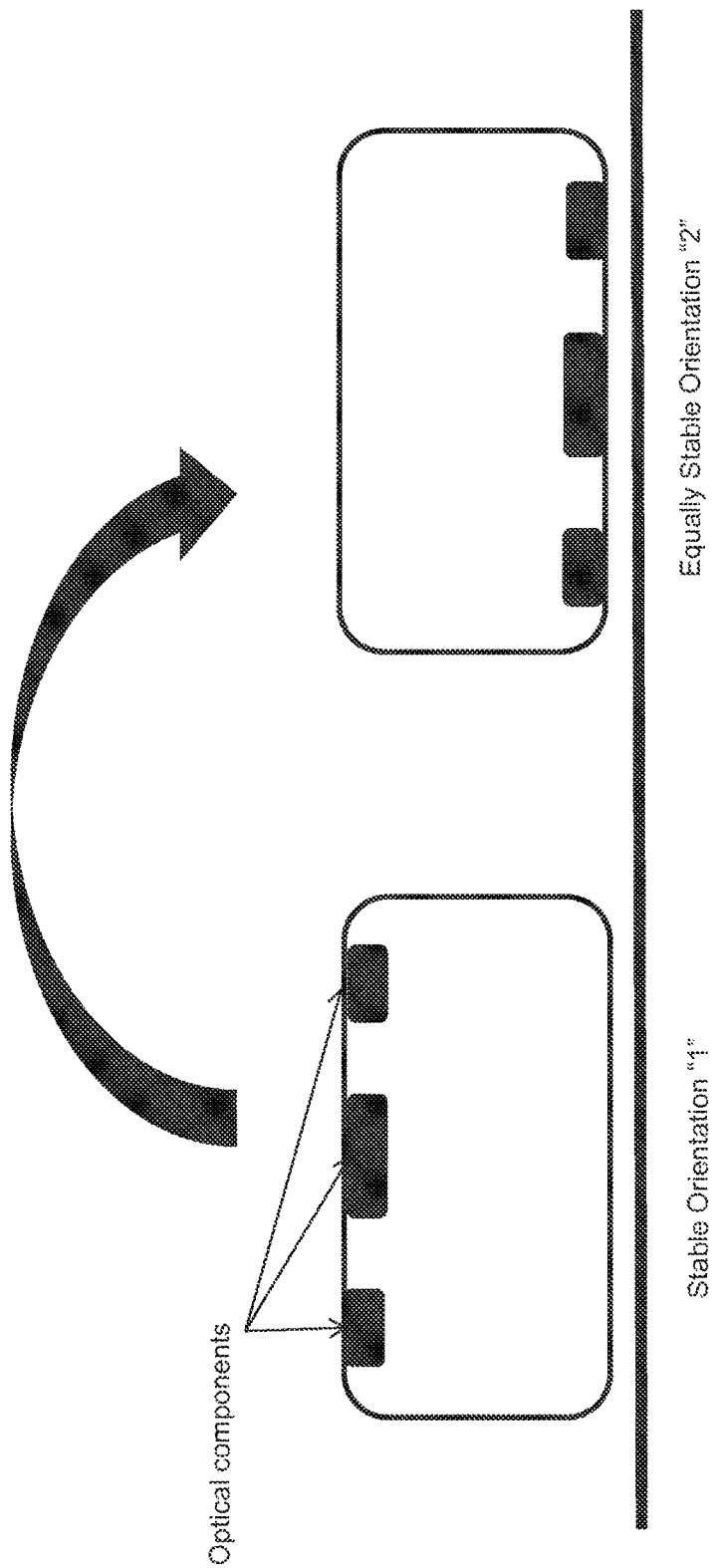

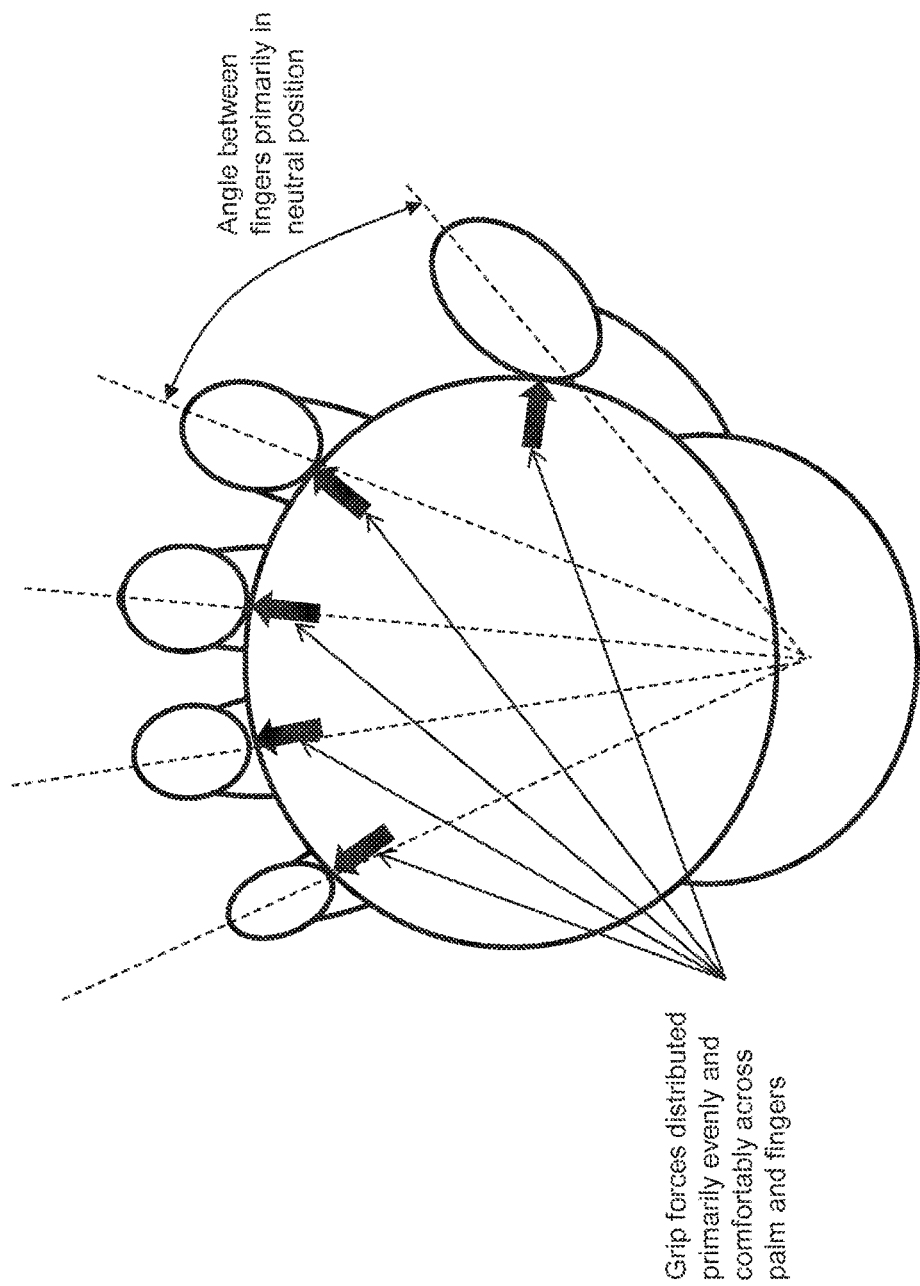

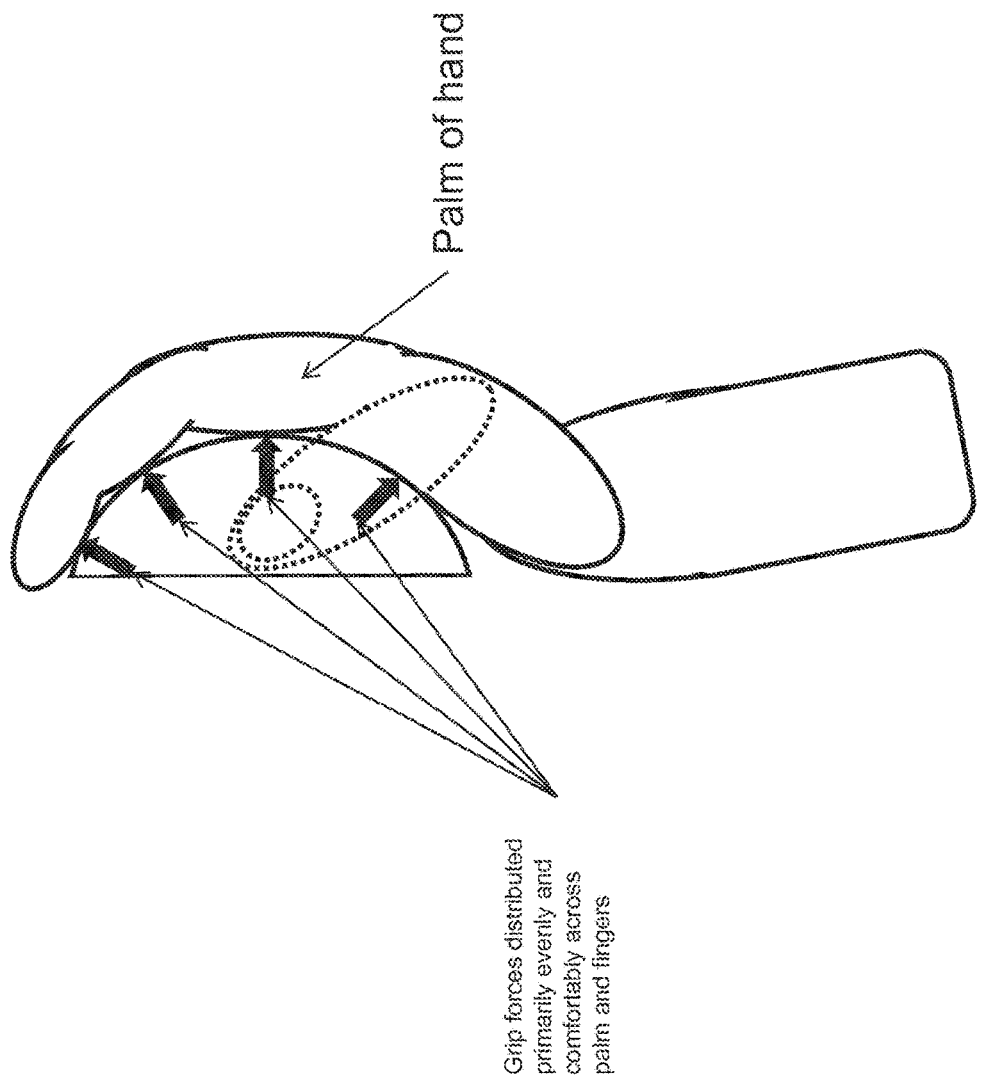

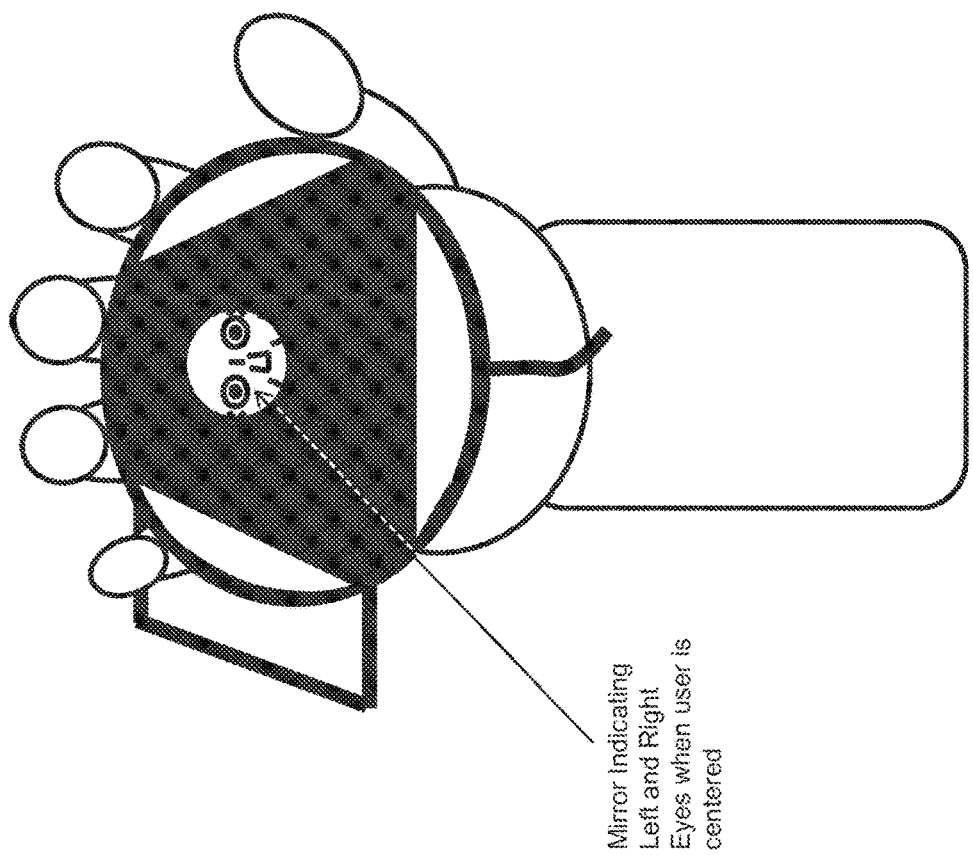

METHODS AND APPARATUS FOR REPETITIVE IRIS RECOGNITION

CROSS-REFERENCE TO RELATED APPLICATIONS

This application is a national stage of, and claims priority to and the benefit of the Patent Application No.: PCT/US2015/010293, filed Jan. 6, 2015, titled "METHODS AND APPARATUS FOR REPETITIVE IRIS RECOGNITION" which in turn claims priority to U.S. provisional application 61/924,055, filed Jan. 6, 2014, titled "METHODS AND APPARATUS FOR REPETITIVE IRIS RECOGNITION"; U.S. provisional application 62/056,598, filed Sep. 28, 2014, titled "METHODS AND APPARATUS FOR REPETITIVE IRIS RECOGNITION" and U.S. provisional application No. 62/056,600, filed Sep. 28, 2014, titled "METHODS AND APPARATUS FOR ILLUMINATING THE IRIS FOR IRIS RECOGNITION," all of which are hereby incorporated by reference in their entireties for all purposes.

BACKGROUND

Biometric recognition methods are used in the fields of security, protection, financial transaction verification, airports, office buildings, to determine or verify the identity of an individual person based on captured biometric characteristics of the individual person. Various factors can affect the performance of biometric recognition. For example, variations in pose between the images results in matching errors even if the faces being compared are from the same person. For another example, the dynamic range or sensitivity of the sensor may not be sufficient to capture biometric information related to the face. In addition, the illumination may vary between the images being matched in the face recognition system. Changes in illumination can result in poor match results since detected differences are due to the illumination changes and not to the fact that a different person is being matched.

SUMMARY

Embodiments of the present invention relate generally to systems and methods wherein the iris biometric of an individual person is acquired using a hand-held device. Once acquired, the iris biometric can be used in many ways, for example, for comparing to a previously-stored iris biometric (recognition) for the authentication of transactions or for login to an account. Such a device therefore may be used repetitively, and in some use cases may be used once every minute depending on the complexity of the transaction. There is a need therefore for an iris recognition device suitable for repetitive use.

Embodiments of the present technology include apparatus and methods for focusing and re-directing light from a point source light for iris recognition. In one example, the apparatus comprises a light emitting diode (LED) mounted such that its optical axis is parallel to the optical axis of an image sensor that acquires an image of an iris of a subject for iris recognition. The apparatus also includes an illumination focusing component, such as a Fresnel lens, placed in front of the LED to focus the light emitted by the LED and to create a first illumination gradient on the subject in front of the image sensor. It may also include an illumination turning component, such as a prism or diffractive optic, placed in front of or behind the illumination focusing component to introduce a second illumination gradient component, such that the combination of the first and second illumination gradients yields a third illumination gradient that is less than either of the first and second illumination gradients.

In another example of the present technology, the apparatus includes an LED mounted such that its optical axis is parallel to the optical axis of an image sensor, an illumination focusing component, such as a Fresnel lens, placed in front of the LED such that the optical axis of the illumination focusing component is offset and/or tilted with respect to the optical axis of the LED.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3 illustrates aspects of the user's experience in the process of FIG. 2.

FIG. 4 illustrates a handheld iris recognition device that is stable when oriented with optical components facing up and when oriented with optical components facing down.

FIG. 11 illustrates forces exerted by a user's hand on a handheld iris recognition device.

FIG. 12A illustrates forces exerted by a user's hand on a handheld iris recognition device.

FIG. 17A illustrates a convex mirror on the bottom surface of a handheld iris recognition device for orienting the device with respect to the user's face.

DETAILED DESCRIPTION

At least three factors affect the design for an iris recognition or iris image acquisition device optimized for repetitive use.

The first factor is the technical requirements of the device to operate successfully. An exemplary device has an infrared camera with a lens that captures imagery of the iris of the user through the bottom of the device in order to perform iris recognition. The iris has a diameter of approximately 11 mm, which typically means that a narrow-field of view lens should be focused closely onto the face of the user to acquire an image of the iris. The device therefore should be held by the user firmly and without any slip, and also should be pointed towards the user's face precisely at the correct orientation and distance. The device may also have infrared illuminators primarily in the range of 700-900 nm which illuminate the iris through the bottom of the device. These illuminators should not be obscured by the fingers or any other part of the user as the user picks it up. In addition, there are some industrial applications where users wear large gloves and need to use a biometric identification system or device to check in and out expensive equipment, or to start dangerous machinery that should only be used by specific trained personnel. This may increase the likelihood that the illuminators become obscured.

Imagery from the camera may be fed to a processor and memory on the device (e.g., within a housing of the device). The device may be tethered to a computer by a universal serial bus (USB) connection or other wired data and/or power interface (e.g., as shown in FIGS. 22-27) and/or may include an antenna (e.g., disposed within or on the housing) for a wireless (e.g., a Bluetooth or WiFi) connection to the computer. The wired connection may provide electrical power and/or the device may include an internal power source, such as a rechargeable battery. In other cases, the device may include a sensor array, one or more IR illuminators, and a data interface (e.g., a USB connection or antenna) operably coupled to the sensor array for transmitting acquired imagery to a processor outside of the housing for iris recognition, e.g., according to known techniques, such as those disclosed in U.S. Pat. No. 5,291,560, which is incorporated herein by reference in its entirety.

Figure 28:
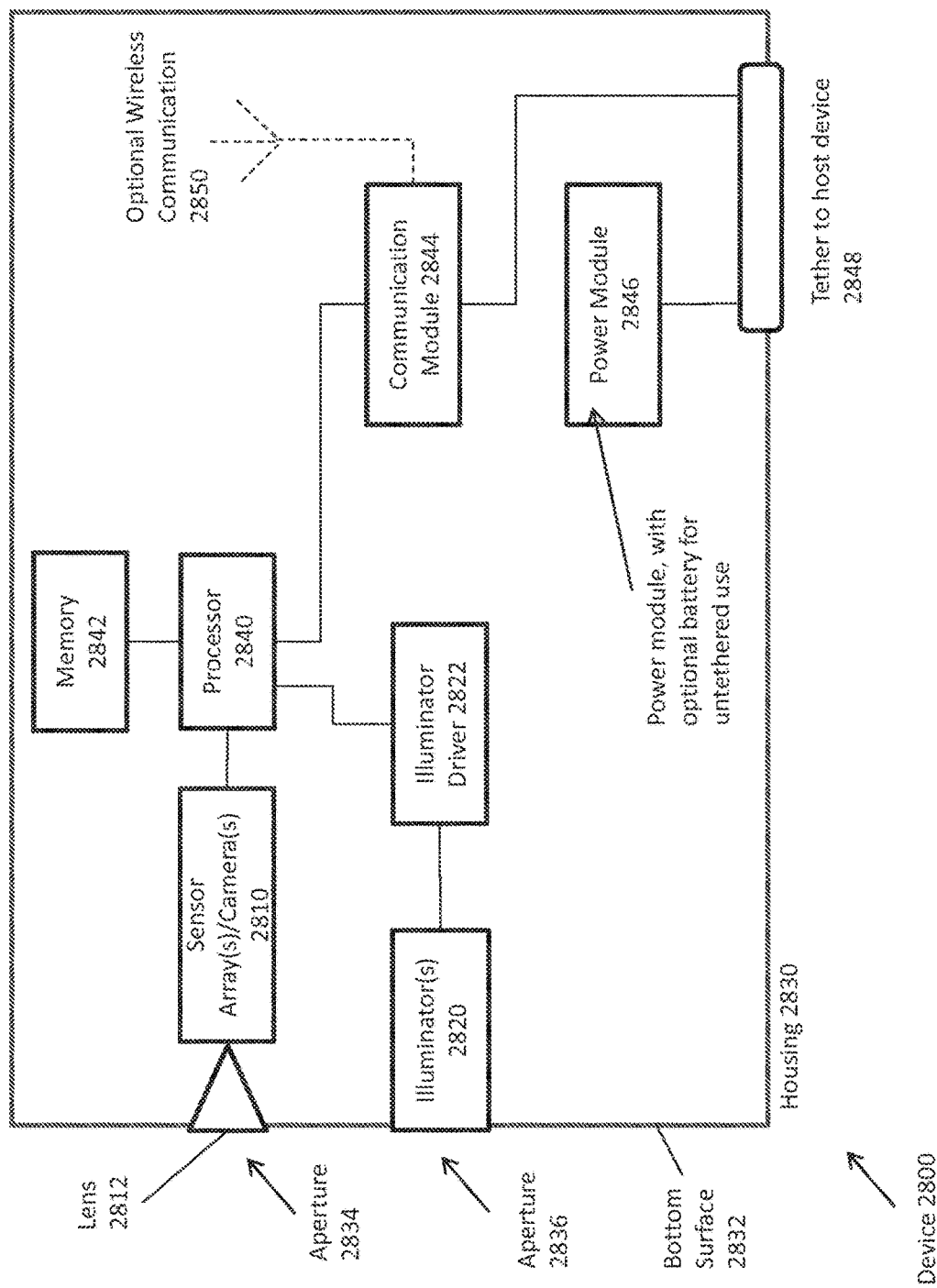
FIG. 28 is a block diagram of an exemplary iris imaging/recognition device according to embodiments of the present invention.

FIG. 28 shows a block diagram of an example iris image acquisition/recognition device 2800. The process of authentication may be initiated automatically by the user presenting their face or iris to a lens 2812 and a sensor 2810 disposed in an aperture 2834 in a bottom surface 2832 of the device's housing 2830. This may be implemented by performing face or eye-finding using a processor 2840 coupled to the sensor 2810 in a first mode of operation and the iris recognition process commences in a second mode of operation if a face or eye is detected. During this first mode of operation, one or more infrared illuminators 2820, which are disposed in another aperture 2836 in the bottom surface 2830, may be controlled by the processor 2840 to be turned on at a reduced illumination intensity, duration, wavelength, or pulse width during in order to increase the illuminators' lifetime as well as reduce light levels below a safety level or threshold, depending on the illumination.

The second mode of operation may be initiated by a signal from a host device (not shown), such as a computer, that is operably coupled to the device 2800 via an input/output interface 2848 and/or a wireless communication interface (antenna) 2850. This signal is conveyed to the processor via the communication module. During the second mode of operation, the processor 2840 may send a signal to an illuminator driver module 2822 to power the illuminators 2820 at the appropriate intensity, duration, and/or pulse width to illuminate the user's iris(es). Images of the iris may then be collected through the lens 2812 and projected onto one or more sensor arrays or cameras 2810. The images may then be fed to the processor 2840 and stored in a memory module 2842 for iris recognition, e.g., using techniques disclosed in U.S. Pat. No. 5,291,560, which is incorporated herein by reference in its entirety.

For instance, the iris from the acquired eye image may be segmented and represented as a digital code. In one implementation of the device 2800, this code can be compared to a previously-acquired code that is stored in the memory module 2842. If the newly-acquired code and the stored code match, then the user is authenticated. The result of the authentication may be sent to a host device through a communication module 2844. The communication module may communicate 2844 using wireless communication via the antenna 2850 and/or using the input/output interface 2848 for the tethered link, for example USB communication. Power for the device may be supplied through a power module 2846, which include one or more rechargeable batteries, or via the input/output interface 2848 and the tethered link, for example USB power. Once the host computer has received the authentication signal, then an application running on the host computer may use the authentication signal as part of an additional process, such as login authentication or an online transaction.

The second factor relates to the hand/eye coordination of the user with respect to the device, in the context of avoiding confusion for the user even when the user is planning how the device should be picked up. Put simply, if the device is lying on a desk, the user can benefit from reference fiducial markings that reduce ambiguities in the way that the device can be picked up and used. Such ambiguities may seem insignificant for a device that is used infrequently, but if the device is used repetitively in a particular use case then determining how to pick up the device even for an instant can break the user's thought process regarding their primary objective in the use case, which may be performing an online transaction or logging in to an account, and is typically not iris recognition per se. The device may be used by the person being recognized (single-user mode), or in some cases may be used by an operator and pointed towards the iris of another person (operator mode).

The third factor is the user's physical comfort using the device, including the comfort related to the user's hand and arm, for example. In the extreme, repetitive use of the wrist and fingers in particular awkward configurations can cause discomfort and medical conditions such as carpal-tunnel syndrome. Even in less extreme cases, awkward placement of the hand and arm can make the device uncomfortable for the elderly to use, and can also discourage people from using the device repetitively. Put another way, the more comfortable the device is to use, then the more likely it is that a user will make use of the device repeatedly.

Figure 1:
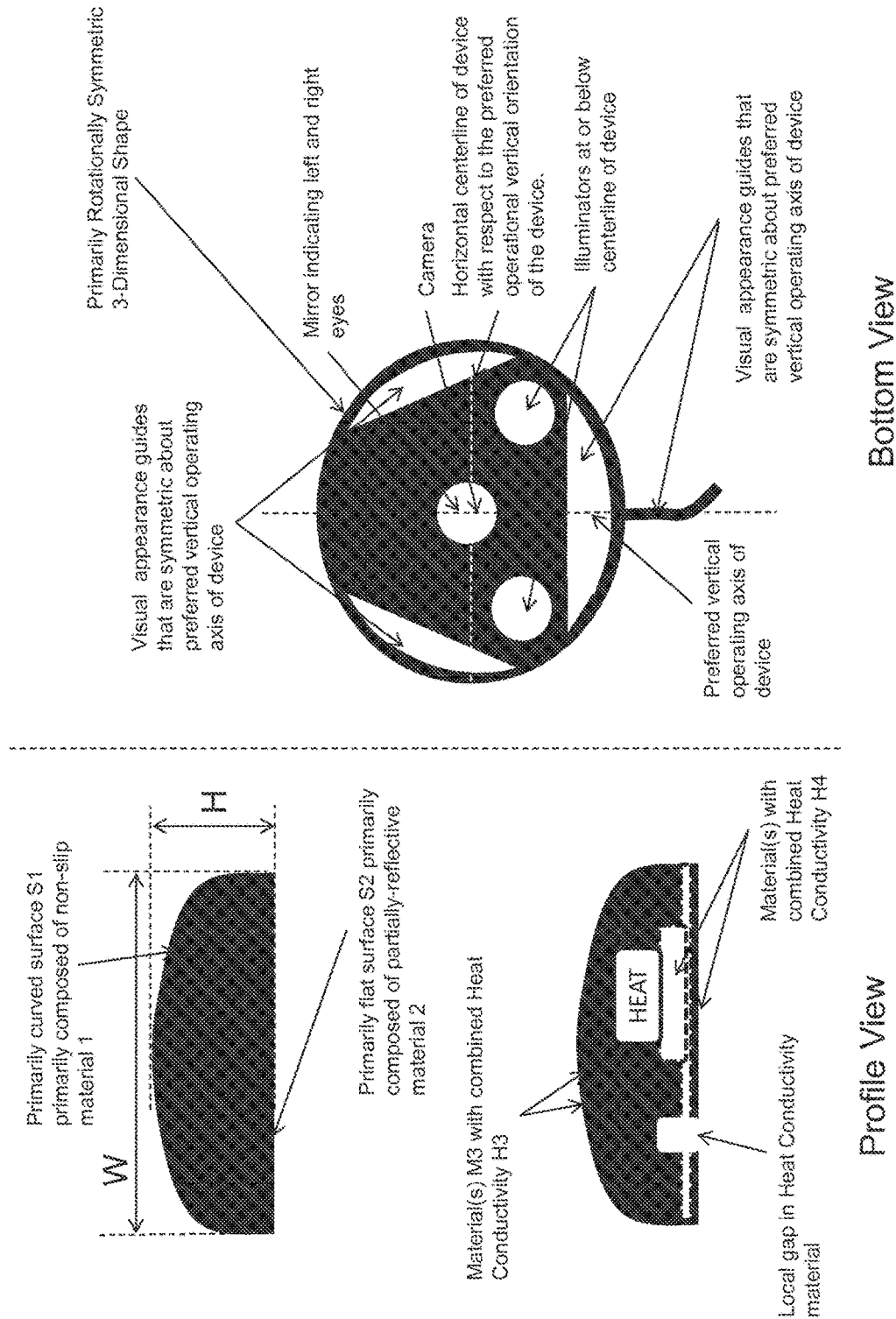
FIG. 1 illustrates a handheld iris recognition device suitable for repetitively acquiring images of a user's iris.

FIG. 1 shows several aspects of an exemplary device. In one aspect, the top of the device may have a curved surface, and the bottom of the device may have a primarily flat (substantially planar) surface. For instance, the device's outer surface may be at least partially in the shape of a hemisphere, paraboloid, or hyperboloid, e.g., so to form an upper surface that is circularly symmetric about an axis normal to the surface on which the device is placed while waiting to be used. In other cases, the device's upper surface may also be shaped like a spheroid (i.e., an ellipsoid having two axes of equal length), such as a prolate or oblate spheroid, that has been cut to form a flat (bottom) surface and a curved (upper) surface.

In another aspect, the top of the device may have an outer surface whose shape and size are selected to fit comfortably within the hand of an average adult without occluding of the sensor array or the infrared illuminator(s) by the hand or fingers. For instance, the device's upper surface may be contoured, e.g., to form a primarily palm-shaped 3D surface, and the bottom of the device may have a primarily flat (substantially planar) surface. In another aspect, the top of the device may have a shaped 3D surface with facets and/or contours that fit the thumb, fingers, and palm, and the bottom of the device may have a primarily flat (substantially planar) surface, e.g., like a mouse for a computer. In some of these cases, the device may have limited rotationally symmetry (e.g., 2-fold, 3-fold, 4-fold, or 5-fold rotational symmetry) about an axis normal to the bottom (substantially planar) surface. In other cases, the device may not have any rotational symmetry about an axis normal to the bottom (substantially planar) surface.

In another aspect, the top of the device may be at least partially composed of or coated with a non-slip material, a pliant material, or a textured material (surface) and the bottom of the device may be at least partially composed of or coated with a partially or wholly-reflective material. In some embodiments the width of the reflective surface on the device may range from 2.5" to 3.5". In some other embodiments the width of the reflective surface in the device may range from 2.5" to 5". In some embodiments the height of the reflective surface on the device may range from 0.9" to 4.3". In some other embodiments, the height of the reflective surface may range from 2.25" to 4.3". In some other embodiments, the height of the reflective surface may range from 0.9" to 2.25".

In another aspect, there may be coarse visual appearance guides (alignment/fiducial marks) on the top or side of the device that are partially or wholly symmetric about a vertical axis with respect to the ground as the device is held up in front of the user's face, with at least one camera in the device pointing forward in a direction parallel to the ground. In a further aspect, the device may have coarse visual appearance guides (fiducial marks) on the top of the device that are symmetric about the vertical axis of the device, where the vertical axis of the device is orthogonal to the ground as the device is held up in front of the user's face with at least one camera in the device pointing forward in a direction parallel to the ground.

In another aspect, the width W of the device may be in the range of 2.5 inches to 3.75 inches (e.g., 2.75-3.50 inches, 3.00-3.25 inches, etc.). In another aspect, the height H of the apex of the device above the flat surface may be in the range of 0.75 inches to 1.5 inches (e.g., about 1.0 inch, about 1.25 inches, etc.). In another aspect, the width W of the device may be in the range of about 1.5 inches to about 5.0 inches. In another aspect, the height H of the apex of the device above the flat surface may be in the range of about 0.25 inches to about 3.0 inches.

In another aspect, the distance (K*H) of the position of the center of gravity of the device from the bottom flat surface of the device in the direction of an axis orthogonal to the bottom flat surface may be equal to or less than half the height of the apex of the device with respect to the bottom of the device. In another aspect, the distance (K*H) of the position of the center of gravity of the device from the bottom flat surface of the device in the direction of an axis orthogonal to the bottom flat surface may be equal to or less than three-quarters the height of the apex of the device with respect to the bottom of the device.

In another aspect, a preferred height H of the apex of the device may be governed by $\theta_{TIP}$=a tan(W/(2.0*K*H)), W is the width of the device, K may vary from 0.2 to 0.75, and $\theta_{TIP}$ is the device at which the device tips over if perturbed on a surface. In one example, the tipping angle $\theta_{TIP}$ may be about 70 degrees. In another example, K may vary from 0.1 to 0.8 (e.g., 0.2-0.7, 0.3-0.6, 0.4-0.5, etc.). In another example, the tipping angle may range from about 50 degrees to about 85 degrees (e.g., 60-80 degrees, 65-75 degrees, 68-72 degrees, and so on).

In another aspect, the thermal emissivity of the material on the bottom of the device may be higher than the thermal emissivity of the material on the top of the device.

In another aspect, materials through which heat is conducted from powered components (e.g., the sensor array and/or the illuminator(s)) to the bottom surface of the device may have a higher combined thermal conductivity compared to that of materials through which heat is conducted to the top of the device. The powered components may include the sensor array, a processor and memory integrated circuits.

In another aspect, there may be one or more gaps in the heat conductivity path on the bottom of the device to provide an optical path through the bottom of the device for optical components, such as the camera and illuminators. In other words, there may be gaps in the material(s) that conduct heat from the sensor array, illuminator(s), (optional) processor, memory, etc. to the outer surface(s) of the housing.

In another aspect, there may be one or more spacers on the bottom of the device sufficiently large to prevent physical contact between the optical surface on the bottom of the device and the surface on which the device is placed, in order to prevent scratching of the optical surface. In a similar aspect, the spacers may be sufficiently large to allow an air gap between the optical surface of the device and the resting surface on which the device is placed. In one aspect, the spacers may be less than 0.125" in length. In another aspect, the spacers may be less than 0.5" in length. In another aspect, the spacers may be less than one quarter the distance of the minimum width of the device.

In another aspect, there may be visual appearance guides (fiducial marks) on the bottom or side of the device that are symmetric about the preferred vertical operating axis of device. In another aspect, there may be visual appearance guides (fiducial marks) on the bottom or side of the device that are partially or wholly symmetric about a vertical axis with respect to the ground as the device is held up in front of the user's face, which in turn is pointing forward in a direction parallel to the ground. In a further aspect, the device may have precise visual appearance guides (fiducial marks) on the bottom of the device that are symmetric about the vertical axis of the device, where the vertical axis of the device is orthogonal to the ground as the device is held up in front of the user's face with at least one camera in the device pointing forward in a direction parallel to the ground.

In another aspect, the illuminators may be at or below the horizontal centerline of the device, where the horizontal centerline is parallel to the ground as the device is held up in front of the user's face with at least one camera in the device pointing forward in a direction parallel to the ground. For example, when viewed from the bottom, the illuminators may be disposed on one side of a diameter of the bottom (planar) surface.

Figure 2:
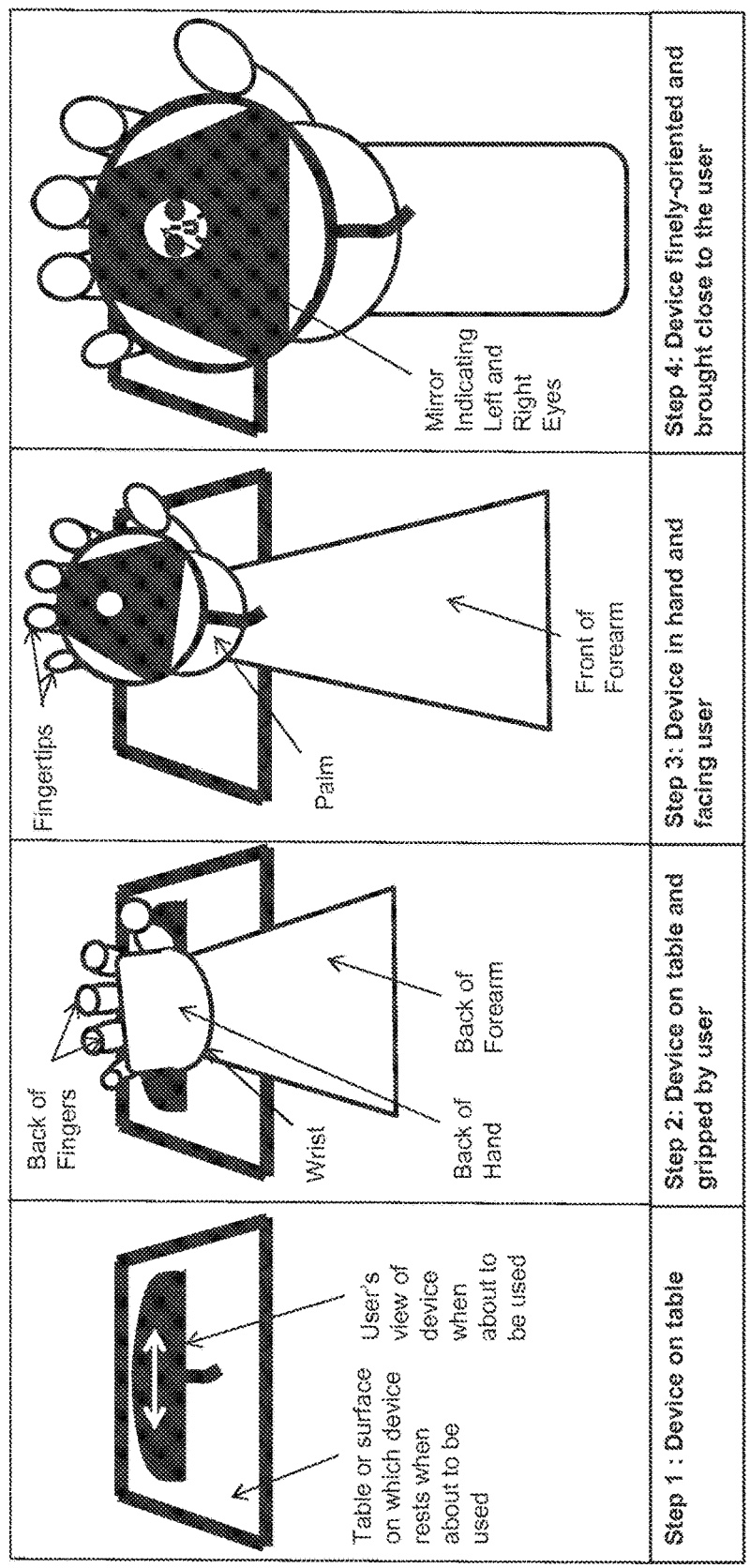
FIG. 2 illustrates a process for acquiring an image of a user's iris using the handheld iris recognition device of FIG. 1.

FIG. 2 shows a four-step process by which the device is used.

In the first step, the device is unused and lying on a desk or flat surface next to the user, waiting to be used. This relates to the factor regarding hand/eye coordination and planning how the device should be used, discussed above.

In the second step, the user reaches out and grasps the device. This relates to the factor of the user's physical comfort in picking up the device, but also the factor of successful iris image acquisition and recognition performance in subsequent steps, for example ensuring that the grasp does not prevent operation by obscuring the illuminators.

In the third step, the user brings the device towards them, while at the same time rotating it about the forearm so that the bottom of the device and, the one or more cameras, and the illuminators view the user in order to perform iris image acquisition or iris image recognition. This relates again to the factor of the user's physical comfort as well as preparation for successful iris recognition performance discussed in the fourth step below.

In the fourth step, the user performs slight adjustments to the orientation of the device, and brings the device closer to them, after which iris image acquisition or iris recognition is performed automatically by the device.

The user then puts the device down on the surface ready for use again shortly thereafter.

FIG. 3 shows a summary of the steps illustrated in FIG. 2. These steps are now broken down in more detail.

FIG. 4 shows one aspect relating to step 1 where an iris recognition device is positioned on a flat surface waiting to be picked up. The device as shown can easily be put on the table with both its top or bottom side facing upwards. In both orientations, the device is equally stable. A user of the device may therefore put the device down in either orientation. The ramification of this is that when the user picks up the device, there are at least two ways for the user to re-orient the device towards them for successful iris recognition. For example, if the device is positioned with the optical surfaces facing upwards (at left in FIG. 4), then the user may have to perform two physical steps rather than one step in order to pick up the device and flip it over to correctly orient the device. As discussed above, such ambiguities and disruptions in device—usage may seem insignificant, but if the device is used repetitively within a particular use case then determining how to pick up the device even for an instant can break the user's thought process regarding their primary objective in the use case, which may be performing an online transaction or logging in to an account, and is typically not iris recognition per se.

Figure 5:
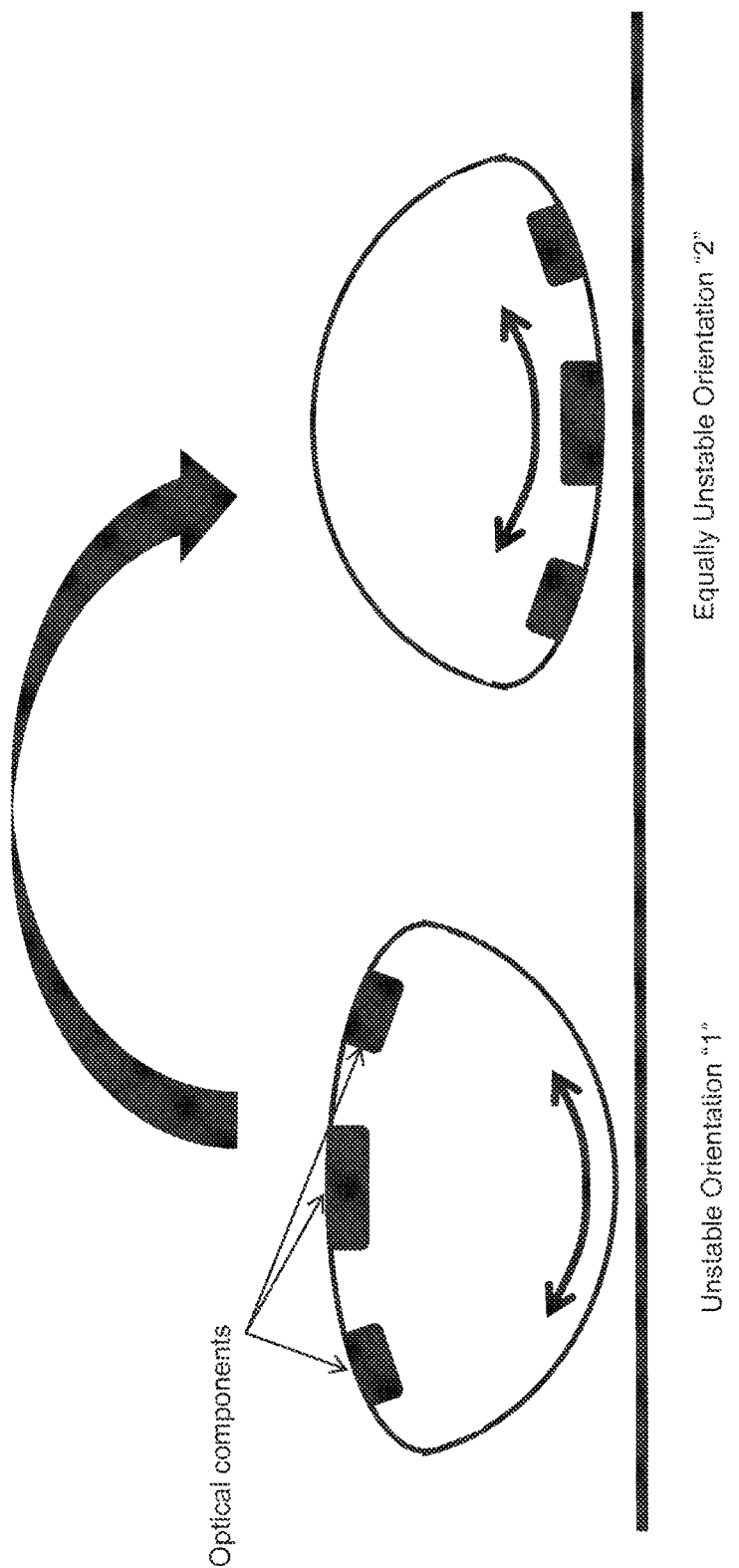
FIG. 5 illustrates a handheld iris recognition device that is unstable when oriented with optical components facing up and when oriented with optical components facing down.

In a related aspect of the problem, FIG. 5 shows a device that, rather than being equally stable in two orientations as shown in FIG. 4, is equally unstable in two orientations. An unstable orientation in this context means that a perturbation by the user can make the device move or tip over, rather than stay stationary or tip back to its original position. In the device shown in FIG. 5, there is no visual cue to the user as to which surface of the device should rest on the table or surface. The user may therefore put the device down in either of the two unstable orientations, and therefore make the re-orientation of the device during the next usage unpredictable as described earlier.

Figure 6:
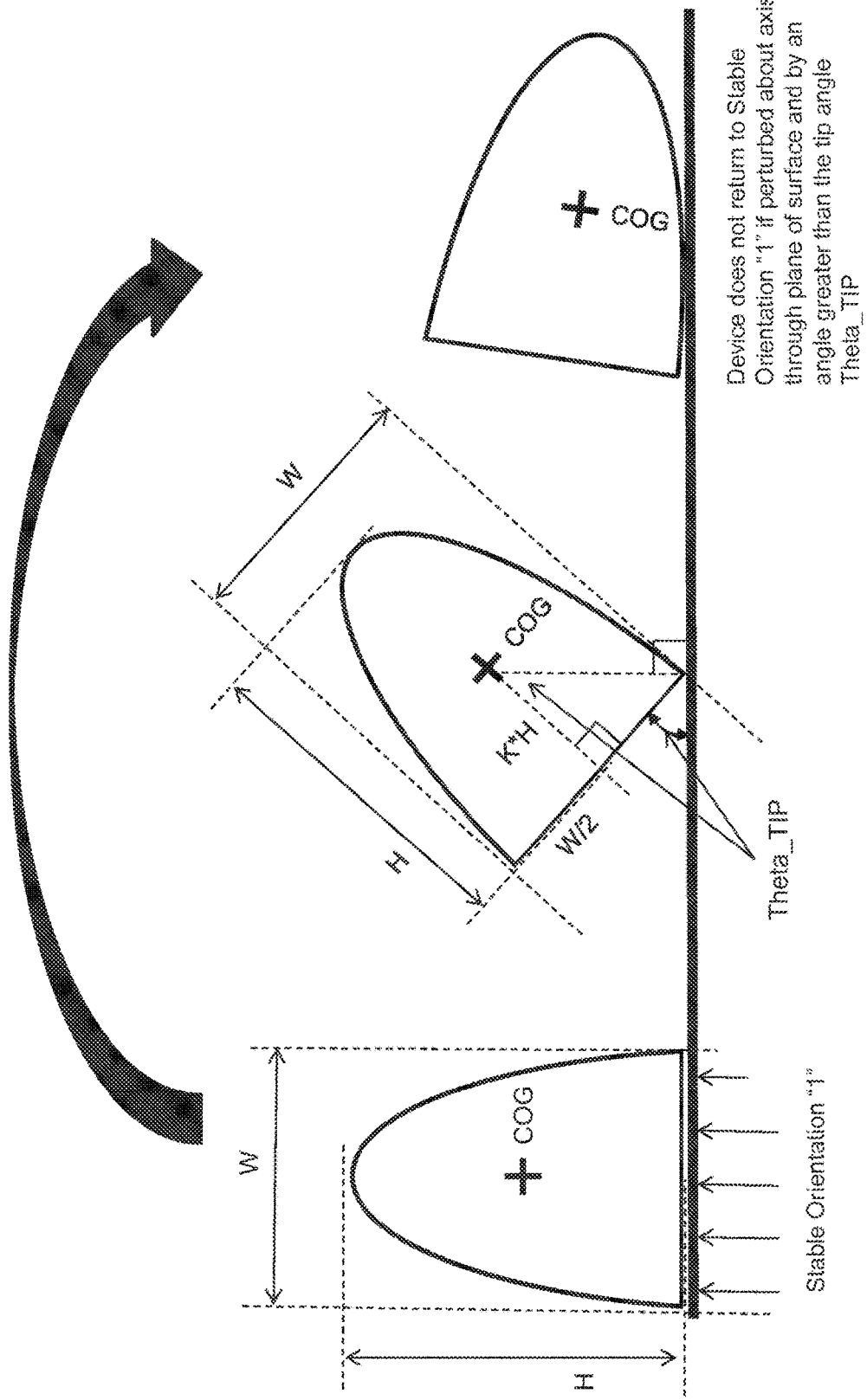
FIG. 6 illustrates a handheld iris recognition device that is stable unless tilted past a predetermined tipping angle $\theta_{TIP}$.

FIG. 6 shows a related aspect of this problem, where the tipping angle of the device $\theta_{TIP}$ is defined by the width W of the device, the height H of the device, and the distance (K*H) of the center of gravity of the device measured from the bottom flat surface of the device in the direction of an axis orthogonal to the bottom flat surface, where K lies between 0 and 1. More specifically, from the geometry of the device shown in FIG. 6, the height H of the device for a given tipping angle $\theta_{TIP}$ is governed by the formula $\theta_{TIP}$=a tan(W/(2*K*H)).

FIG. 6 shows a related aspect of this problem, where the width W, height H, distance (K*H) of the center of gravity (COG) of the device measured from the bottom flat surface of the device in the direction of an axis orthogonal to the bottom flat surface (where K lies between 0 and 1) defines the tipping angle of the device. More specifically, from the geometry of the device shown in FIG. 6, the height H of the device for a given tipping angle $\theta_{TIP}$ is governed by the formula $\theta_{TIP}$=a tan(W/(2*K*H)).

Figure 7:
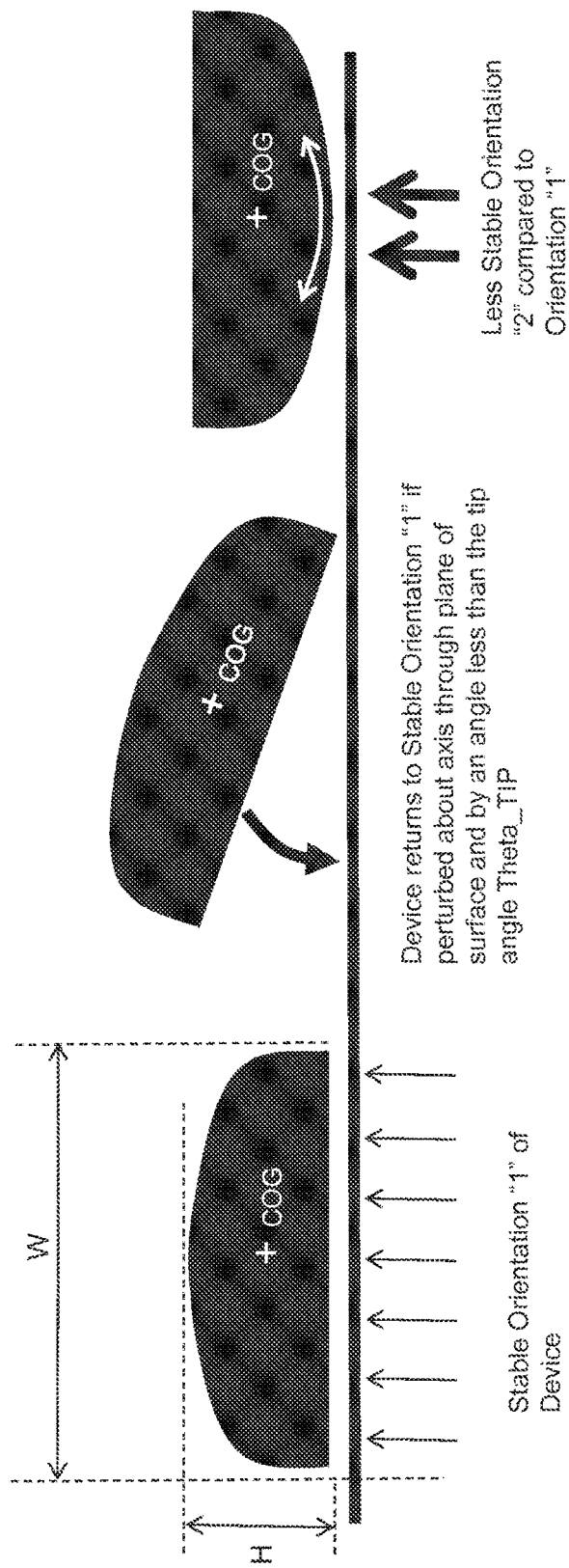
FIG. 7 illustrates a handheld iris recognition device that remains in a stable first orientation unless tilted past a predetermined tipping angle $\theta_{TIP}$, and a less stable second orientation.

FIG. 7 illustrates an exemplary handheld iris recognition device. The top of the device may have a primarily curved outer surface, and the bottom of the device may have a primarily flat (substantially planar) outer surface. This has the effect of providing the visual and tactile cues to the user that the flat surface of the device should be placed on the flat surface of the table, and that the curved surface of the device should be oriented upwards. If the curved surface was placed on the flat surface, then the device would be in a naturally unstable orientation, which a user could recognize for example from tactile feedback, such as rocking of the device when grasped on the table top, due to the small contact area of the device with the surface. By comparison, when the flat surface of the device is placed on the flat surface of a flat table-top, the large and spatially-distributed contact area of the device with the surface provides stability of the device.

Related to this, good device stability is achieved if the tipping angle, $\theta_{TIP}$, of the device is equal to or greater than 70 degrees. If a user inadvertently nudges the device to such a tipping angle or less, then the device naturally returns back to its original orientation on the surface ready for subsequent use. This can be contrasted to the situation where the device is knocked over into a position that requires additional manipulation by the user to re-orient the device back into the preferred position. Moving the center of gravity of the device towards the bottom of the device also reduces the likelihood of tipping. This further improves stability since lowering the center of gravity increases the tipping angle of a given device. In one aspect, a preferred value of K, which controls the center of gravity, may be equal to or less than 0.5. In another aspect, a preferred height H of the apex of the device is governed by where the tipping angle $\theta_{TIP}$=a tan(W/(2.0*K*H), W is the width of the device, and K may vary from 0.2 to 0.75. The tipping angle $\theta_{TIP}$ may be equal to 70 degrees. In another example, K may vary from 0.1 to 0.8. In another example, the tipping angle may range from 50-85 degrees.

In the stable orientation of the device, the optical surface of the device is facing down on the surface on which the device is positioned. Grit or dust on that surface however can potentially scratch the optical surface of the device, thereby distorting the images captured by the iris recognition device thereby preventing reliable iris image acquisition or recognition. In one aspect, one or more spacers are positioned on the bottom of the device. The spacers are sufficiently large to prevent physical contact between the optical surface on the bottom of the device and the surface on which the device is placed. Put another way, the spacers are sufficiently large to allow an air gap between the optical surface of the device and the resting surface on which the device is placed. The spacers may be small and less than 0.125" in size, for example. The spacer may comprise a ridge that substantially follows the perimeter of the optical surface of the device, as shown in FIG. 7.

Figure 8:
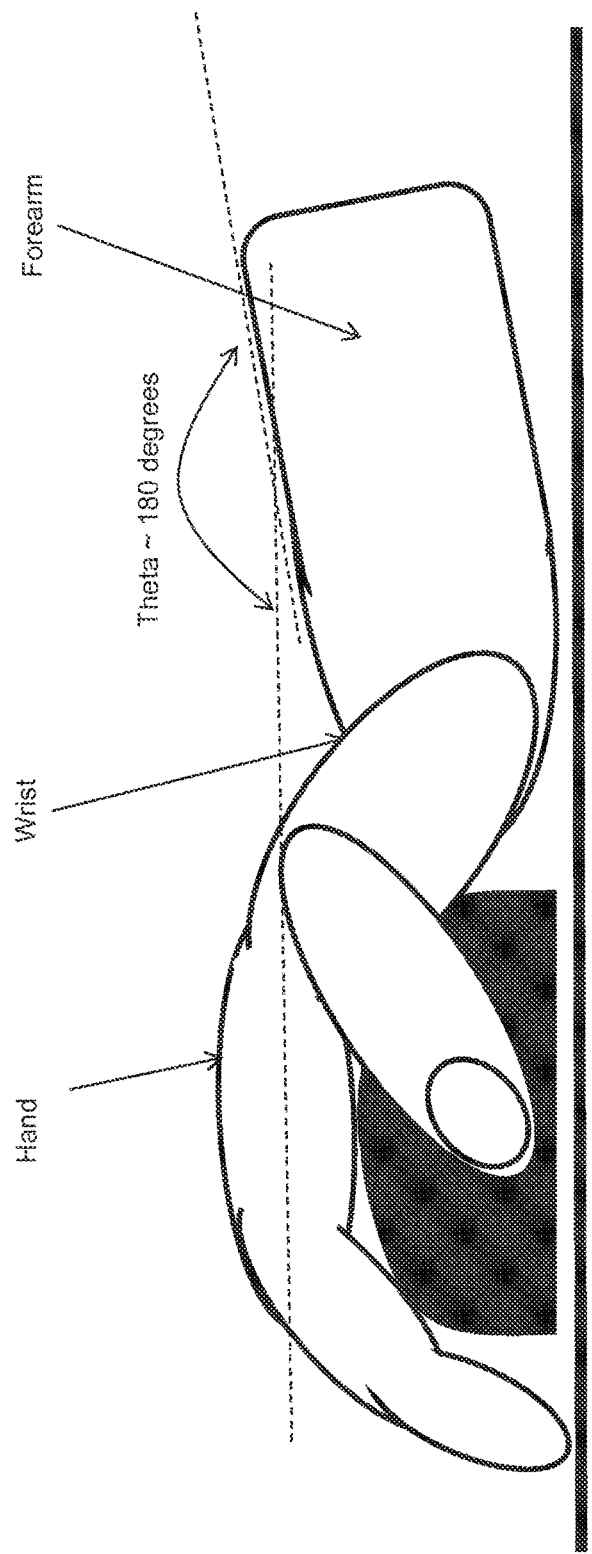
FIG. 8 illustrates another view of the handheld iris recognition device of FIG. 7.

FIG. 8 shows another view of the handheld iris recognition device shown in FIG. 7. In this view, the user has reached out with their palm and fingers, and has grasped the device. The fact that device is grasped from the top means that the angle between the hand and forearm is naturally in a neutral position with a value close to 180 degrees, as shown in FIG. 8. The neutral position for a human joint (such as the wrist/forearm joint) is typically the position that is mid-way in the range of motion of the joint. This is typically the most comfortable position for any user, especially the elderly since their range of joint-motion can be limited.

Figure 9:
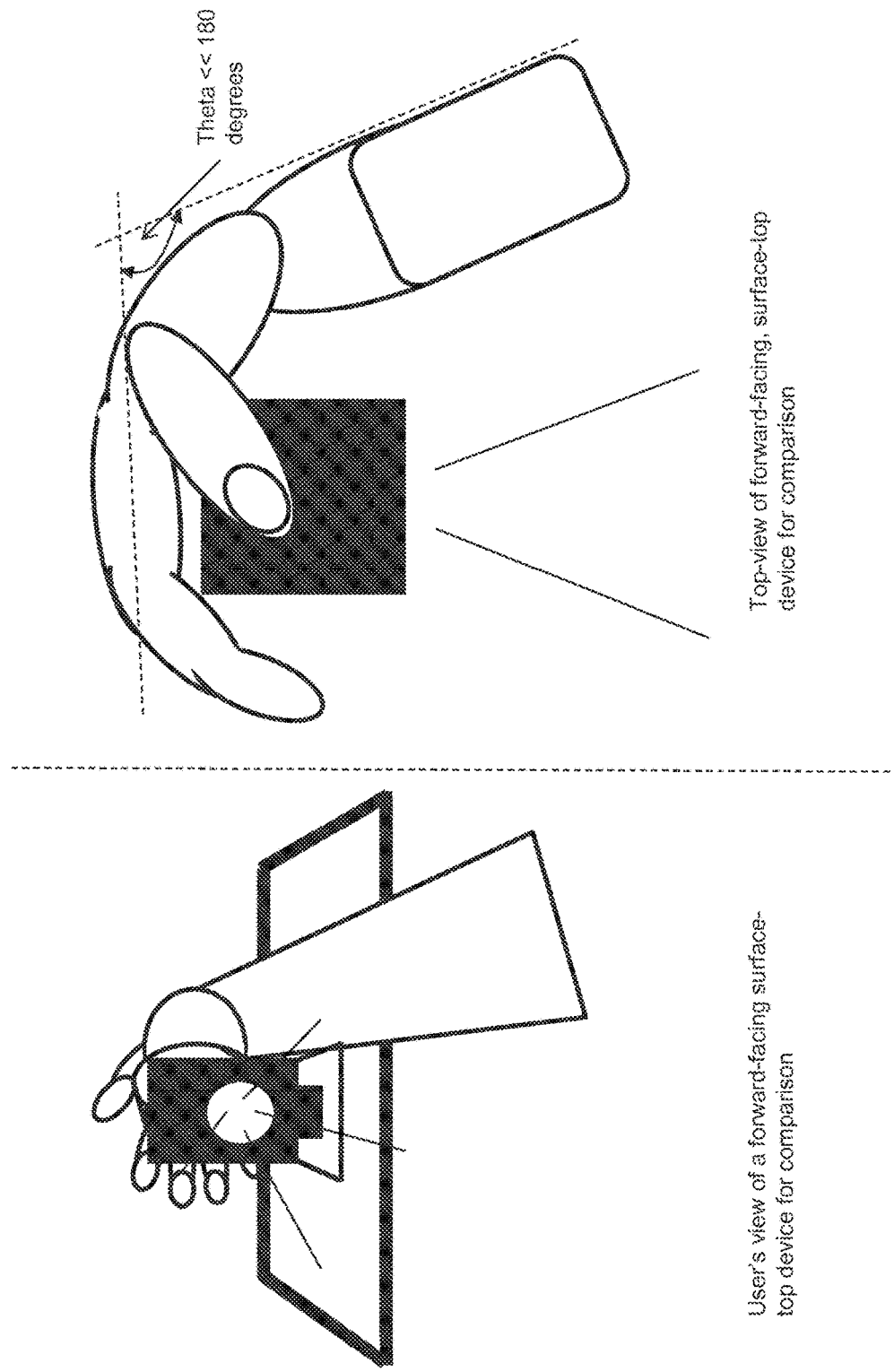
FIG. 9 shows a user's view (left) and a top view (right) of a forward-facing, desktop iris recognition device.

This can be contrasted to the front-facing, table-top iris recognition device shown in FIG. 9. In this case the user has to reach behind the device to prevent obscuration of the optical components in order to enable successful iris image acquisition, thereby causing the angle between the hand and forearm to be significantly less than 180 degrees, and therefore significantly far from the neutral position.

Figure 10:
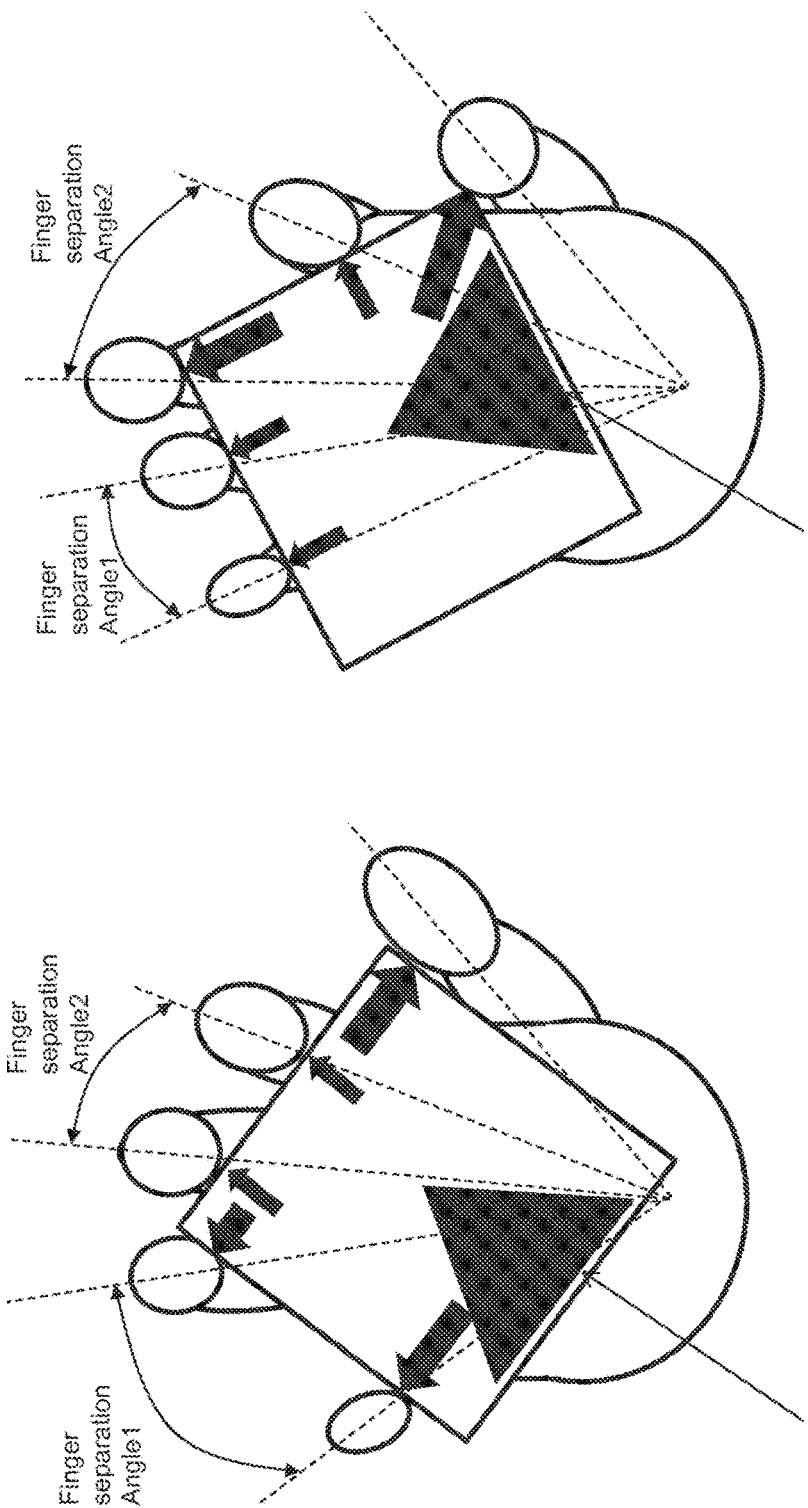
FIG. 10 illustrates a multi-faceted handheld iris recognition device.

FIG. 10 shows another aspect of the problem. It shows a device that can be picked up in different orientations, and that also has irregular surfaces that the user can hold in different ways. On the left in FIG. 10 the user has picked up the device in one orientation using fingers splayed appropriately to make contact with the irregular surfaces of the device. FIG. 10 shows that the fingers are now splayed from their natural neutral positions. On the right in FIG. 10 the user has picked up the device in a different orientation using fingers splayed differently so that they make contact with the differently-oriented surfaces of the device. Depending on the positions of the fingers and the orientations of the surfaces, the user may also have to press harder or softer on the different surfaces to ensure that the device is held firmly as they pick it up, as shown by the arrows of various thicknesses in FIG. 10.

FIG. 11 on the other hand shows an example related to this problem. The device is rotationally symmetric about an axis normal to the surface on which the device is placed while waiting to be used. This has the property that the user does not have to choose an orientation or set of surfaces to grasp. This means that the fingers of the user can rest close to their neutral and most comfortable positions as shown in FIG. 11. It also means that the gripping forces are distributed across all fingers, which increases comfort and also reduces the likelihood that the device will slip due to an unstable grip concentrated within just a few fingers.

FIG. 12 shows this aspect in a profile view of the device as the user is holding it up. The arrows in FIG. 12 are illustrative of the forces holding the device, and indicate that they are primarily equally and comfortably distributed across all the fingers.

Figure 12B:
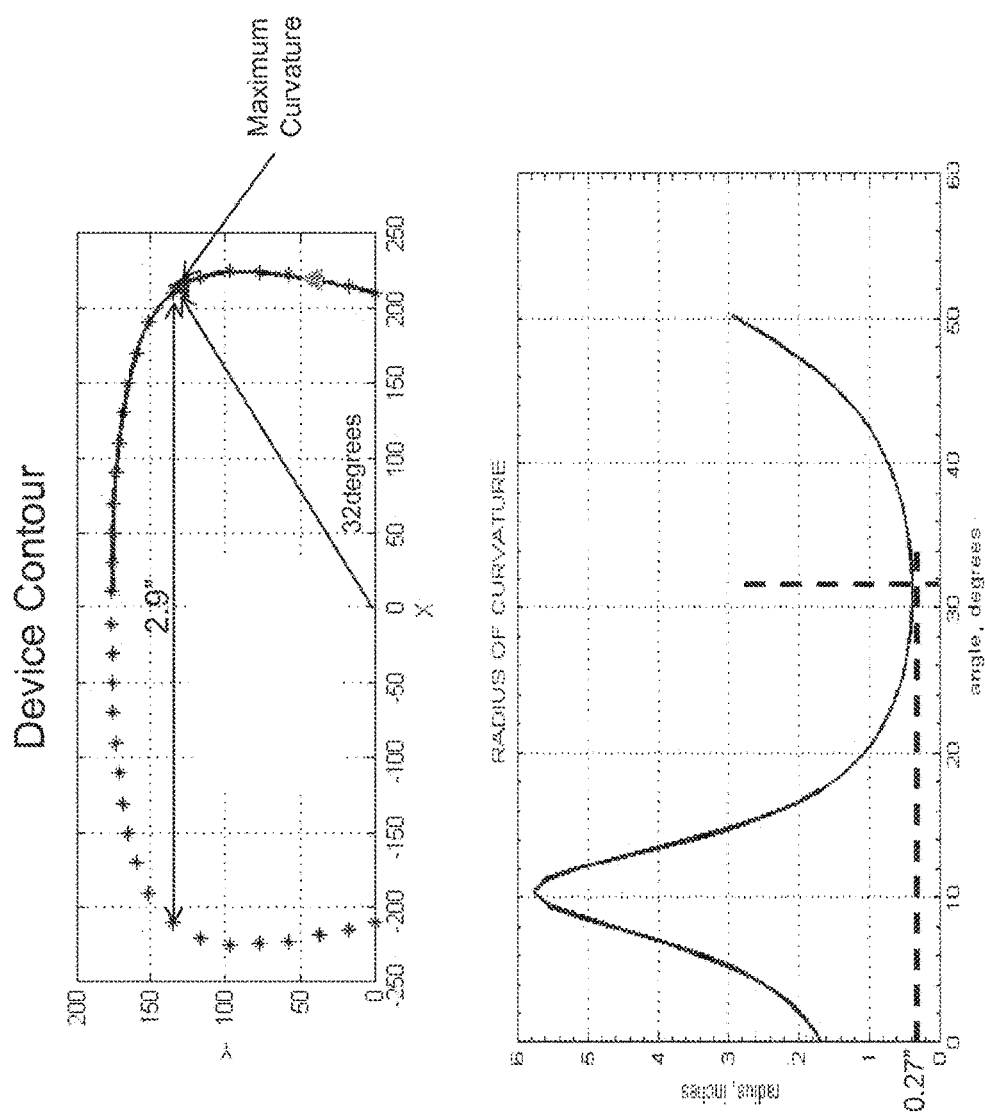
FIG. 12B illustrates aspects related to the curvature along an example contour of the handheld iris recognition device.

Another aspect is shown in FIG. 12B. The top figure shows an example contour of the device in profile. The bottom figure shows the local radius of curvature of the contour using polar coordinates to specify the contour location. Zero degrees represents the point on the contour of the device that touches the surface on which the device rests. Ninety degrees represents the apex (top of the device). The curvature is shown only between zero and fifty degrees since in this example the local radius of curvature increases beyond the range of the graph. Radius of curvature is inversely proportional to the sharpness of the contour at any point—the smaller the radius of curvature, then the sharper the object is at that point. In one aspect the minimum radius of curvature of the contour of the top surface of the device is 0.27". In another aspect, the minimum radius of curvature of the contour of the top surface of the device is in the range of 0.1 to 1". In another aspect, the location of the minimum radius of curvature is 1.45" from a vertical axis orthogonal to the bottom surface of the device. In another aspect, the location of the minimum radius of curvature is in the range of 1" to 2.5" from a vertical axis orthogonal to the bottom surface of the device.

In another aspect of the invention related to the grip of the device, the top of the device may be composed primarily of a non-slip material to further improve the user's grip on the device. In a further aspect the device has coarse visual appearance guides (fiducial marks) on the top or side of the device that are symmetric about the preferred vertical operating axis of device. In a further aspect, the device has coarse visual appearance guides (fiducial marks) on the top of the device that are symmetric about the vertical axis of the device, where the vertical axis of the device is orthogonal to the ground as the device is held up in front of the user's face with at least one camera in the device pointing forward in a direction parallel to the ground.

A coarse visual guide (or fiducial marks) may be, for example, text written on top of the device that provides an approximate orientation (about an axis orthogonal to the surface on which the device lies) at which the user should pick up the device, or a picture of a hand, or a logo with an orientation. Other suitable marks include but are not limited to arrows, rulings, and images of fingerprints, fingers, or hands, The coarse visual guide may also be a cable exiting the device at the side on the preferred vertical axis. These coarse visual guides minimize the degree to which the user has to use their wrist and forearm to perform fine adjustment in a subsequent step of the device usage described later.

In another aspect, the bottom of the device may be composed primarily of a partially or fully reflective material in order to discourage the user to touch it in comparison to a surface on the top of the device that may be matt in appearance. Intuitively, users prefer to pick up devices using surfaces that are matt in appearance rather than glossy or semi-glossy, since the latter surfaces are associated with optical reflective surfaces that typically have no tactile function but only a visual or optical function. In some embodiments, the width of the reflective surface may be chosen to be approximately half the width of a human head so that by the property of mirrors a virtual image of the full width of the head may be seen by the user at any distance from the mirrored surface, and therefore intuitively guide the user to look at the device. The width of the human head may vary between 5" to 7" approximately. Therefore in some embodiments the width of the reflective surface on the device may range from 2.5" to 3.5". In some cases, the thickness due to hair at the side of the head may be significant and may vary between 0" and 3", giving a total head width of 5" to 10". Therefore in some other embodiments the width of the reflective surface in the device may range from 2.5" to 5". The height of the reflective surface may be chosen to be approximately half the height of the separation of critical features of the face; the eyes, nose, mouth, chin and top of the head. The average distance from the top of the eyes to the bottom of the nose may be approximately 1.8". The average distance from the top of the eyes to the bottom of the chin may be approximately 4.5". The average distance from the top of the head to the bottom of the chin may be approximately 8.6". Therefore in some embodiments the height of the reflective surface on the device may range from 0.9" to 4.3". In some other embodiments, the height of the reflective surface may range from 2.25" to 4.3". In some other embodiments, the height of the reflective surface may range from 0.9" to 2.25".

Figure 13:
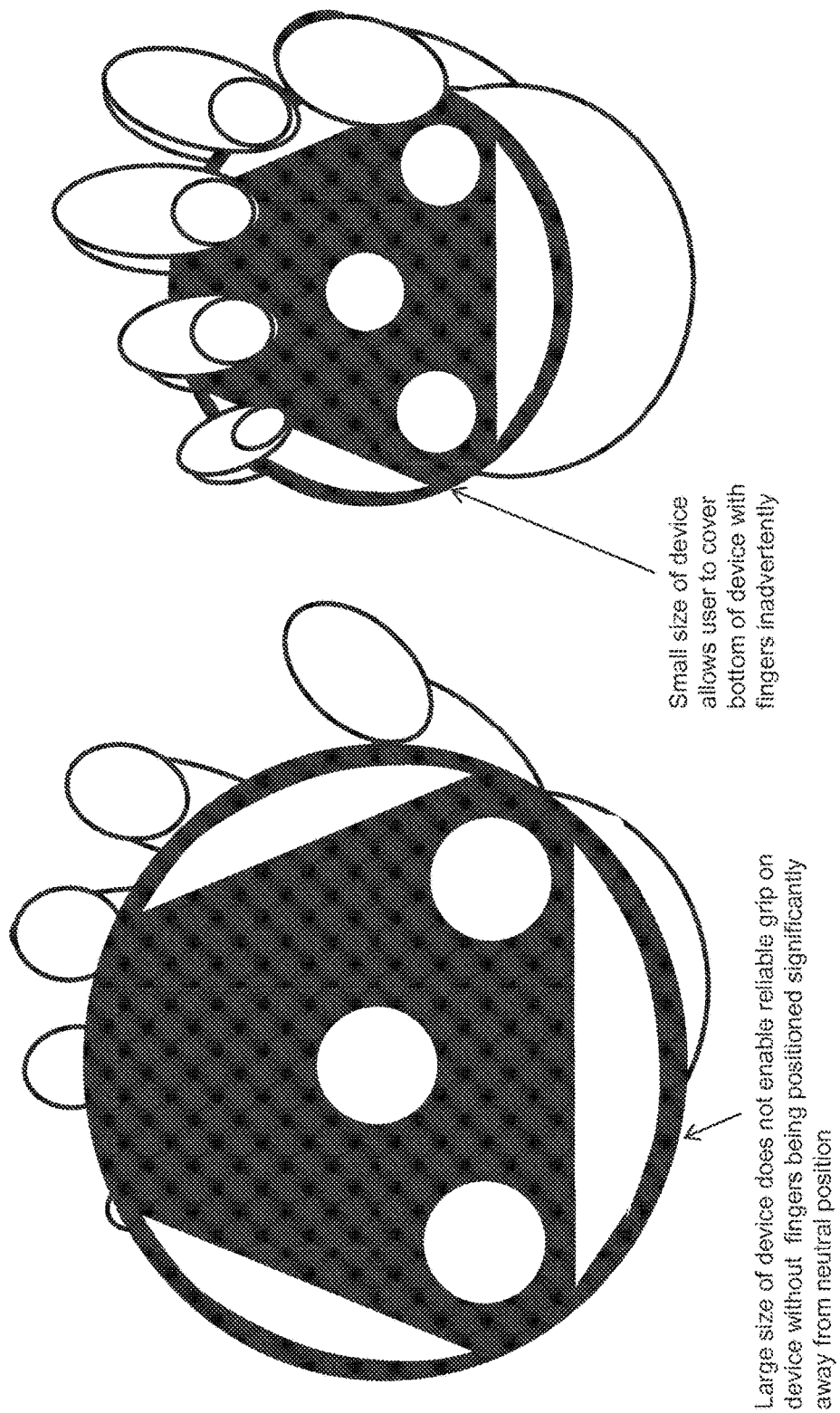
FIG. 13 illustrates large and small handheld iris recognition devices held by an average-sized hand.

FIG. 13 shows another aspect of the problem. The device on the left has a large width W. The large width of device prevents the user from reliably gripping the device, or at least not without the fingers being positioned significantly away from their neutral positions. On the other hand, the device on the right has a small width W. In this case the small width of the device allows the user to partially cover the bottom of the device with their fingers inadvertently. Since the optical components, such as the illuminators, are positioned on the bottom of the device, then the performance of iris recognition can be negatively impacted.

Figure 14:
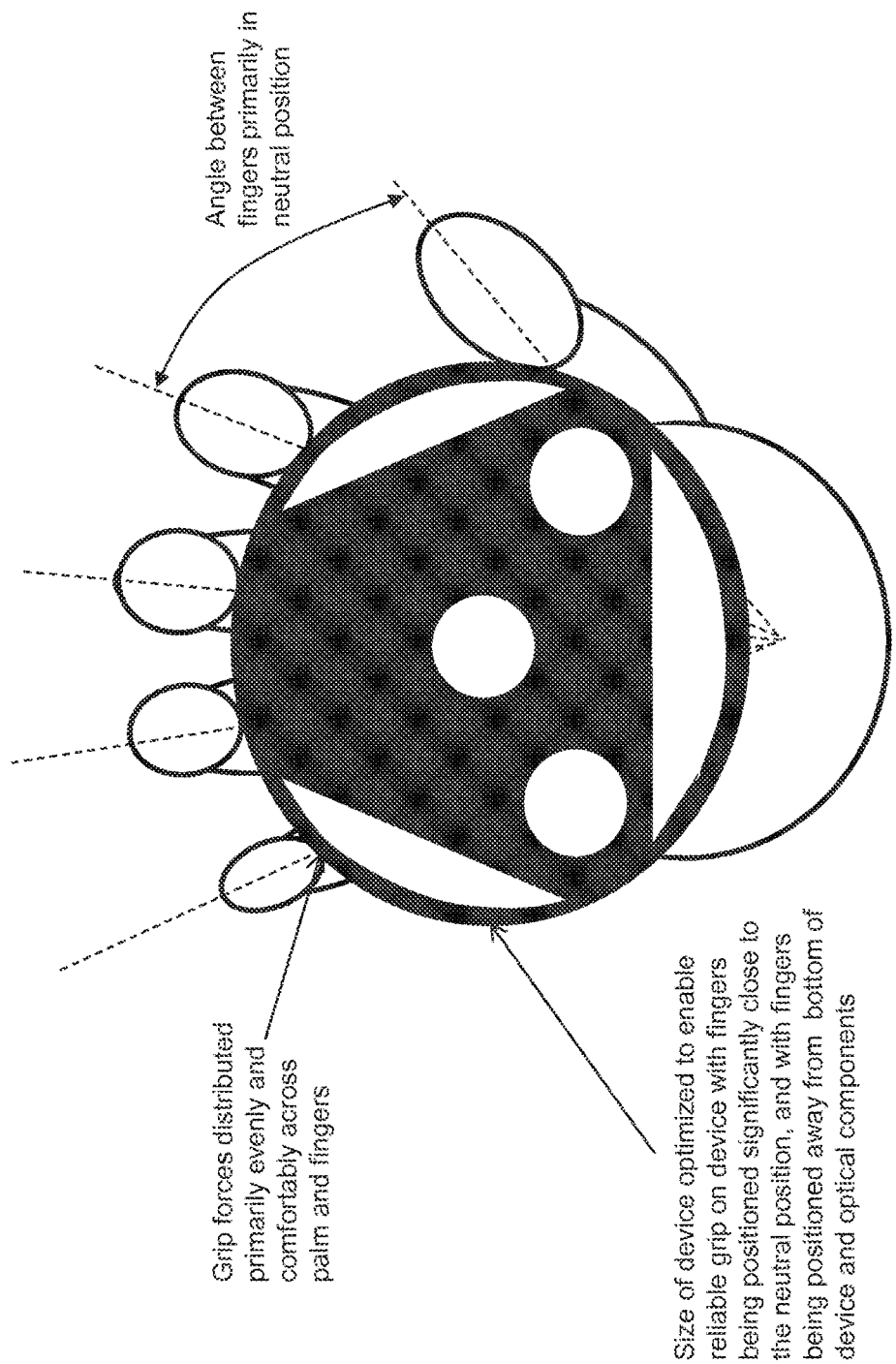
FIG. 14 illustrates a handheld iris recognition device sized to fit comfortably within a hand without inadvertent occlusion of the sensor array or infrared illuminators.

FIG. 14 shows an iris recognition device sized to fit within a user's hand without the user's fingers obscuring the sensor array or illuminators. The width of the device is optimized to enable reliable grip on device with fingers being positioned significantly close to the neutral position, and with fingers being positioned away from the bottom of device and optical components. The average palm-width for an adult is in the range of 2.9 to 3.2 inches. A preferred width W of the device may be in the range of 2.5 to 3.75 inches, since this also accommodates younger users and also users with larger hands or who are wearing gloves. In another aspect, a preferred range may be 2.25 inches to 5 inches.

Figure 15:
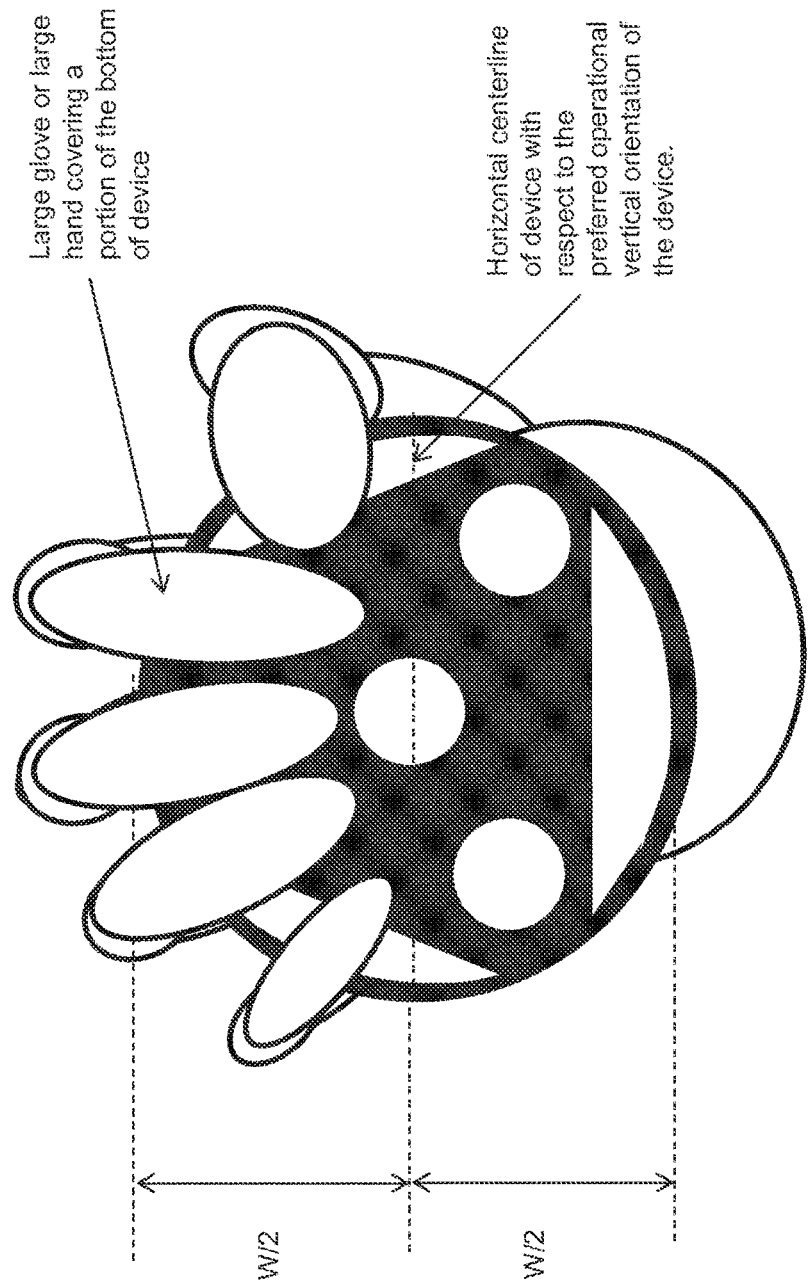
FIG. 15 illustrates the handheld iris recognition device of FIG. 14 gripped by a large hand or glove.

FIG. 15 shows another related aspect. In this case, notwithstanding the preferred width of the device, since the fingers primarily hold the device in a semi-circular ring around the top side of the device, then it is still possible in some cases for tips of the users fingers to reach onto the flat surface of the device in a top semi-circular area as shown in FIG. 15. The likelihood that the fingers will affect operation may be reduced in our device by positioning the illuminators at or below the horizontal centerline of the device, such that the illuminators lie in the bottom semi-circular area of the device. The horizontal centerline of the device is defined with respect to the preferred operational vertical orientation of the device. In another aspect, the horizontal centerline is parallel to the ground as the device is held up in front of the user's face with at least one camera in the device pointing forward in a direction parallel to the ground.

Figure 16:
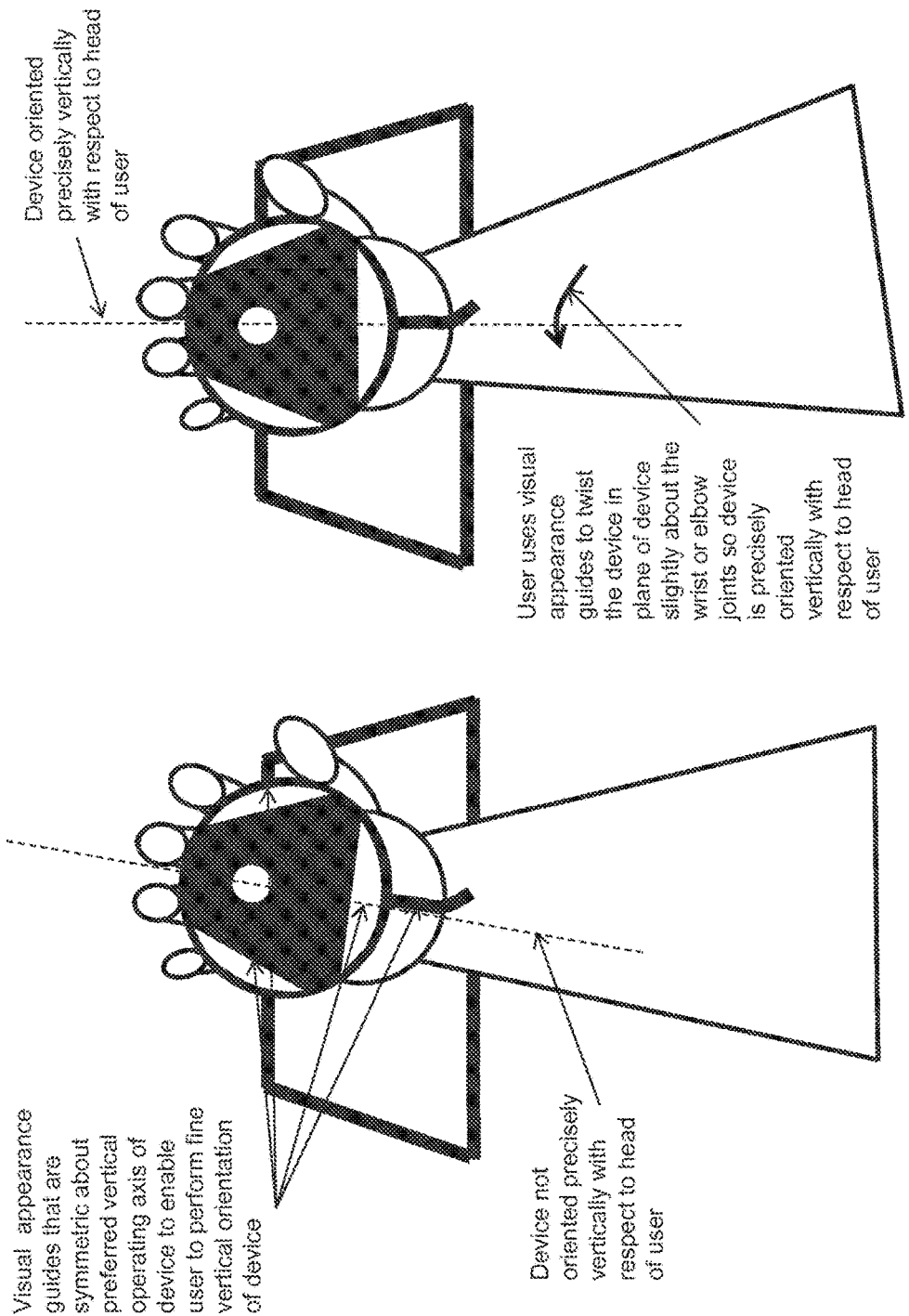
FIG. 16 illustrates how to orient the handheld iris recognition device of FIG. 14 for acquisition of an image of an iris.

FIG. 16 shows aspects relating to the third and fourth steps in the usage of the device. The figure shows that the device has been picked up and rotated to face the user. This significant twist rotation is spread over the complete length of the forearm, so that there is no local large-range rotation required at the wrist for example. In another aspect, as discussed earlier, the iris has a diameter of approximately 11 mm, which typically means that a narrow-field of view lens is focused closely onto the face of the user. In operation, the device therefore should be pointed towards the user precisely at the correct orientation and distance. In this aspect, the device has precise visual-appearance guides (alignment marks/fiducial marks) that may be symmetric about the preferred vertical operating axis of device to provide the visual cues that enable the user to perform fine vertical orientation of the device. In a related aspect, the device may have precise visual appearance guides (fiducial marks) on the bottom of the device that are symmetric about the vertical axis of the device, where the vertical axis of the device is orthogonal to the ground as the device is held up in front of the user's face with at least one camera in the device pointing forward in a direction parallel to the ground. Since coarse orientation of the device has already been performed by the user in choosing how to pick up the device, as described earlier, then only fine orientation of the device remain. This is performed by small adjustment of the wrist and forearm about their neutral positions, which is comfortable even for elderly users with limited range of joint motion, as discussed earlier.

Graphical User Interface (GUI) Indicator

FIG. 17A shows a related aspect. In this aspect there is a convex mirror positioned on the bottom of the device. The user positions themselves such that both eyes are visible in the mirror.

Figure 17B:
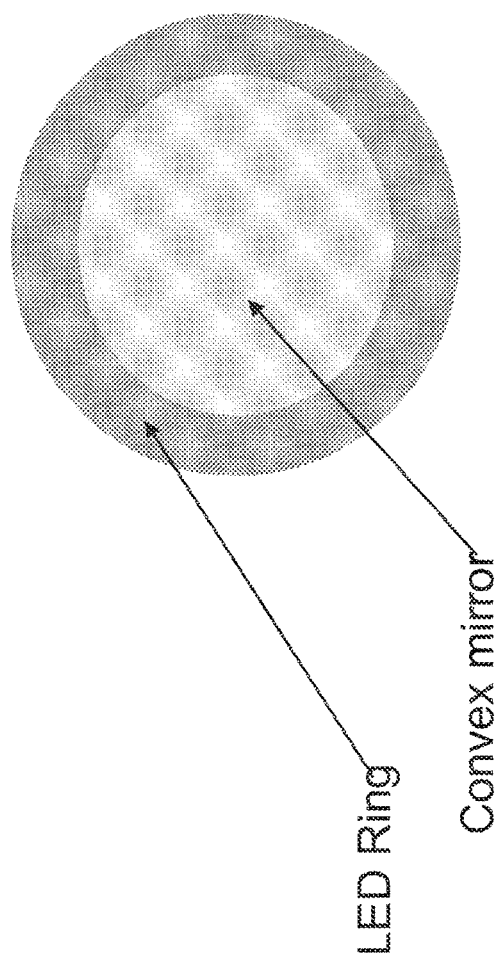
FIG. 17B illustrates a convex mirror, e.g., as in FIG. 17A, with a graphical indicator (ring illuminator) disposed such that the geometric center of gravity of the illumination is coincident with the center of gravity of a convex mirror.

In some embodiments of repetitive-use iris recognition devices, there is a convex mirror for the purpose of directing the gaze of the user and for centering the face in the convex mirror, e.g., as shown in FIGS. 17A and 17B.

FIG. 17B shows that an indicator illuminator may be positioned uniformly around the mirror. The indicator illumination may change color depending on the status of the device, and provide feedback to the user. The uniform illumination around the mirror reduces the likelihood of or prevents the user's eye from being drawn to any one particular location next to the mirror, which can then cause confusion on where the user should look; the mirror or the particular location. The uniform illumination around the mirror provides a non-geometrically biased illumination with respect to the position of the mirror so that the eye of the user is drawn to the geometric center of gravity of the illumination display which coincides with the geometric center of gravity of the mirror in the plane of the display. The mirror is convex such that the face of the user appears in the mirror, as opposed to a single eye that may appear in a flat mirror. A flat mirror can cause a geometrical bias in the user's view since then the user would position their dominant eye over the flat mirror resulting in a confusing view comprising a virtual image of the eye from the flat mirror in one eye and a real image of the device from the other eye.

The extent or width of the illumination may be small enough to reduce or minimizes the attraction of the convex mirror to the user, and yet not so small that it is not noticeable. A possible ratio of the width of the surrounding illumination to the width of the mirror is in the range of 1 to 0.5-40.

Figure 18:
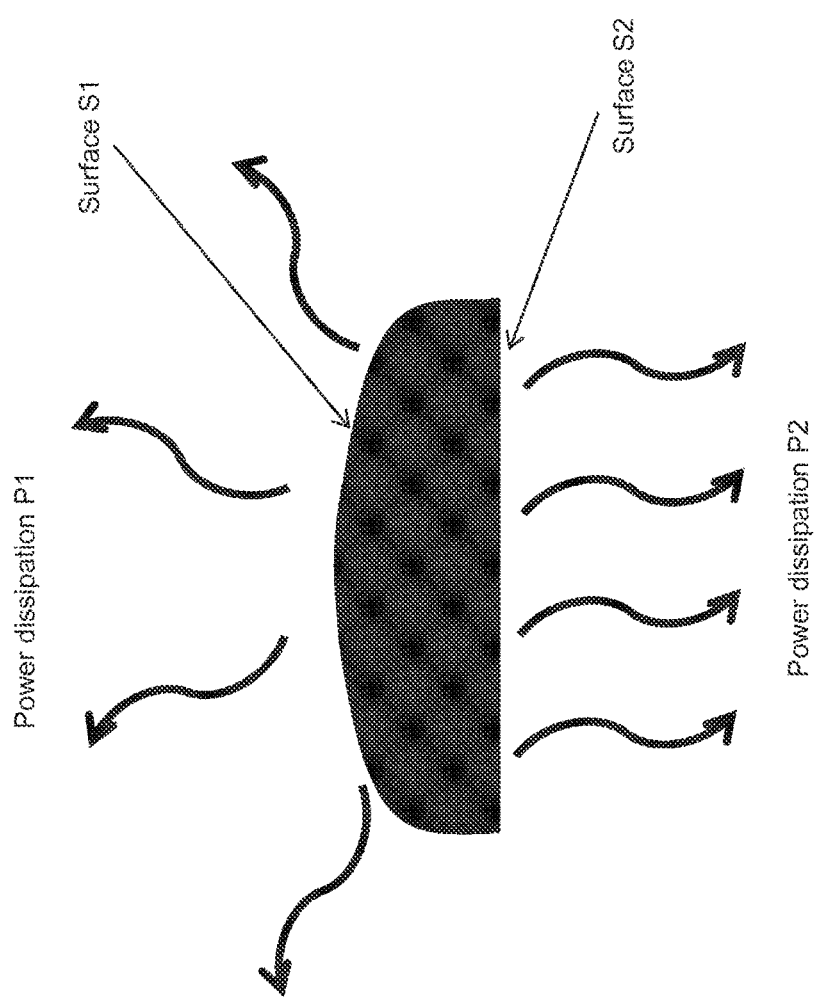
FIG. 18 illustrates evenly distributed power dissipation through outer surfaces of a handheld iris recognition device.

FIG. 18 shows another aspect of the problem, relating to the comfort of the user and the power dissipation of the device. The device may be powered by a USB socket on a computer, which typically can provide 5 V at 500 mA. This results in up to 2.5 W of power that may need to be dissipated from the device. This may seem a small amount of power, however the device is meant for repetitive use, and this in turn means that the device might not be turned off and may always be operating. The heat from this continuous power-flow into the device is dissipated from the device.

FIG. 18 shows power from the top and bottom surfaces being dissipated. If the heat emissivities of the bottom and top surfaces of the device are equal, then putting convective and other factors aside, the temperature of the bottom and top surfaces will be equal. In practice, with only 2.5 W being dissipated, the primary consideration is not pain or damage to the user, but slight discomfort and potentially confusion that such a hand-held surface is very warm to the touch. For example, the user may expect that the device should operate with minimal heat dissipation and therefore unplug it periodically to prevent heating. This adds another step and additional time in the next use of the device, neither of which is conducive to repeated use of the device. The problem is exacerbated somewhat since convective currents within the device send warmer air upwards towards the top, hand-held surface of the device, which can make the hand-held surface warmer than the bottom surface even given equal emissivities of the surfaces.

Figure 19:
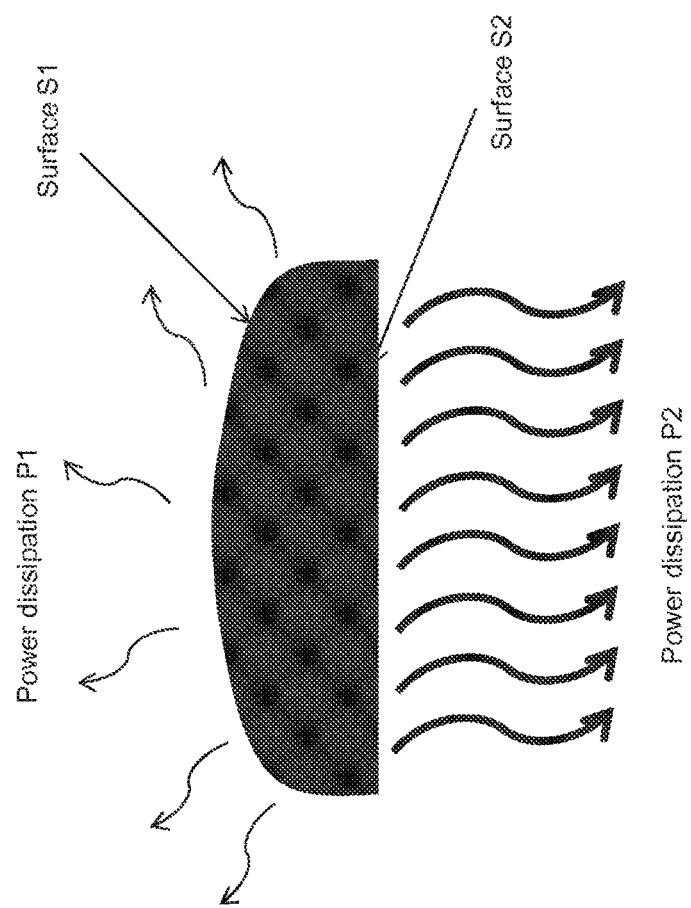
FIG. 19 illustrates unevenly distributed power dissipation through outer surfaces of a handheld iris recognition device.

FIG. 19 shows one aspect of the invention that addresses this. In this aspect the bottom surface S2 of the device may have a higher emissivity than the top surface S1 of the device. Since the user may not touch the bottom of the device, more heat is directed away through the bottom of the device than through the top of the device, as shown in FIG. 19. In another aspect, material is placed within the airgap between the hot components and the top surface to reduce convective heating of the top surface from air currents. Such material may include polystyrene.

Figure 20:
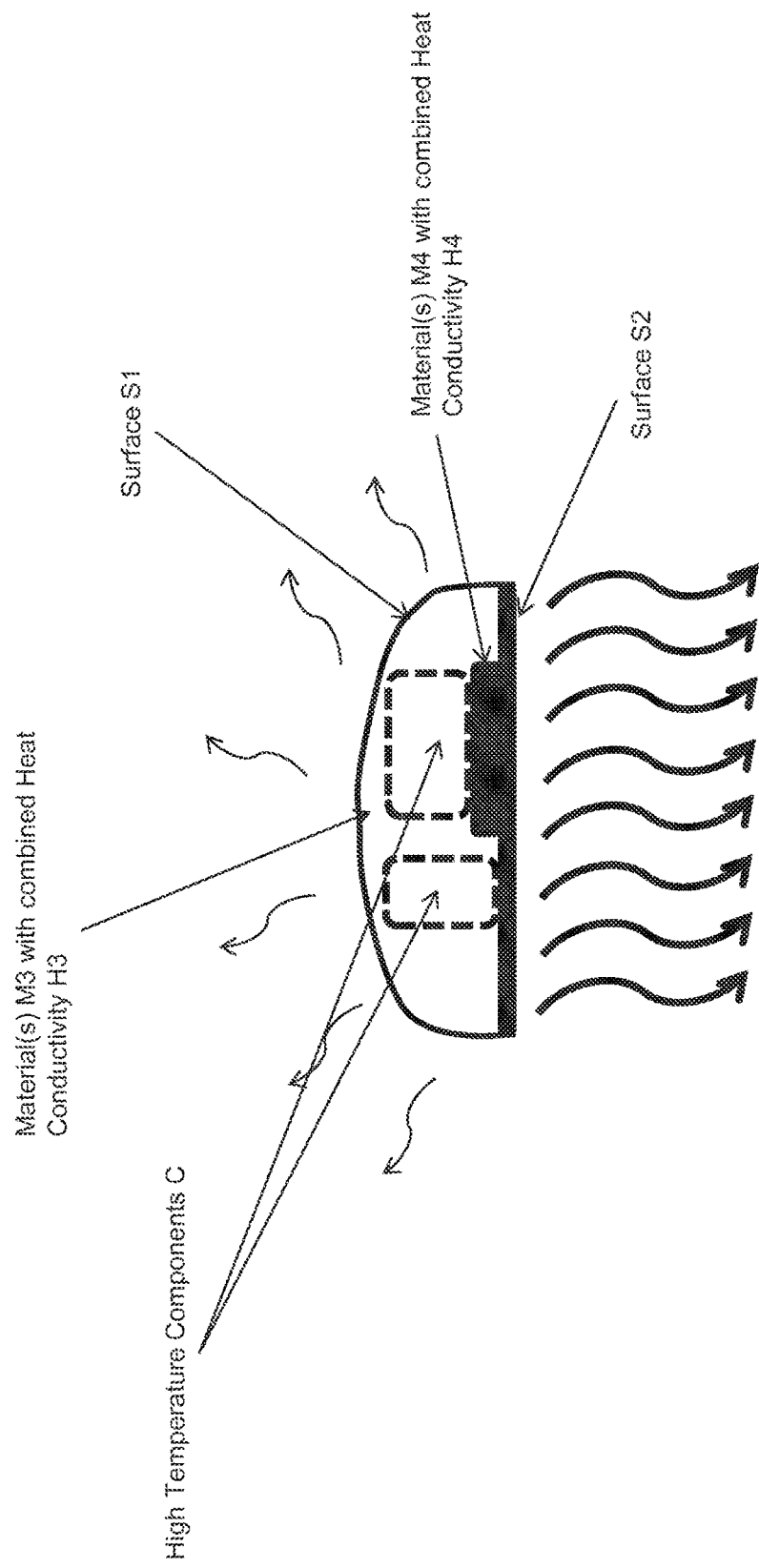
FIG. 20 shows thermal conduction paths from electronic components through thermally conductive materials to the outer surfaces of a handheld iris recognition device.
Figure 21:
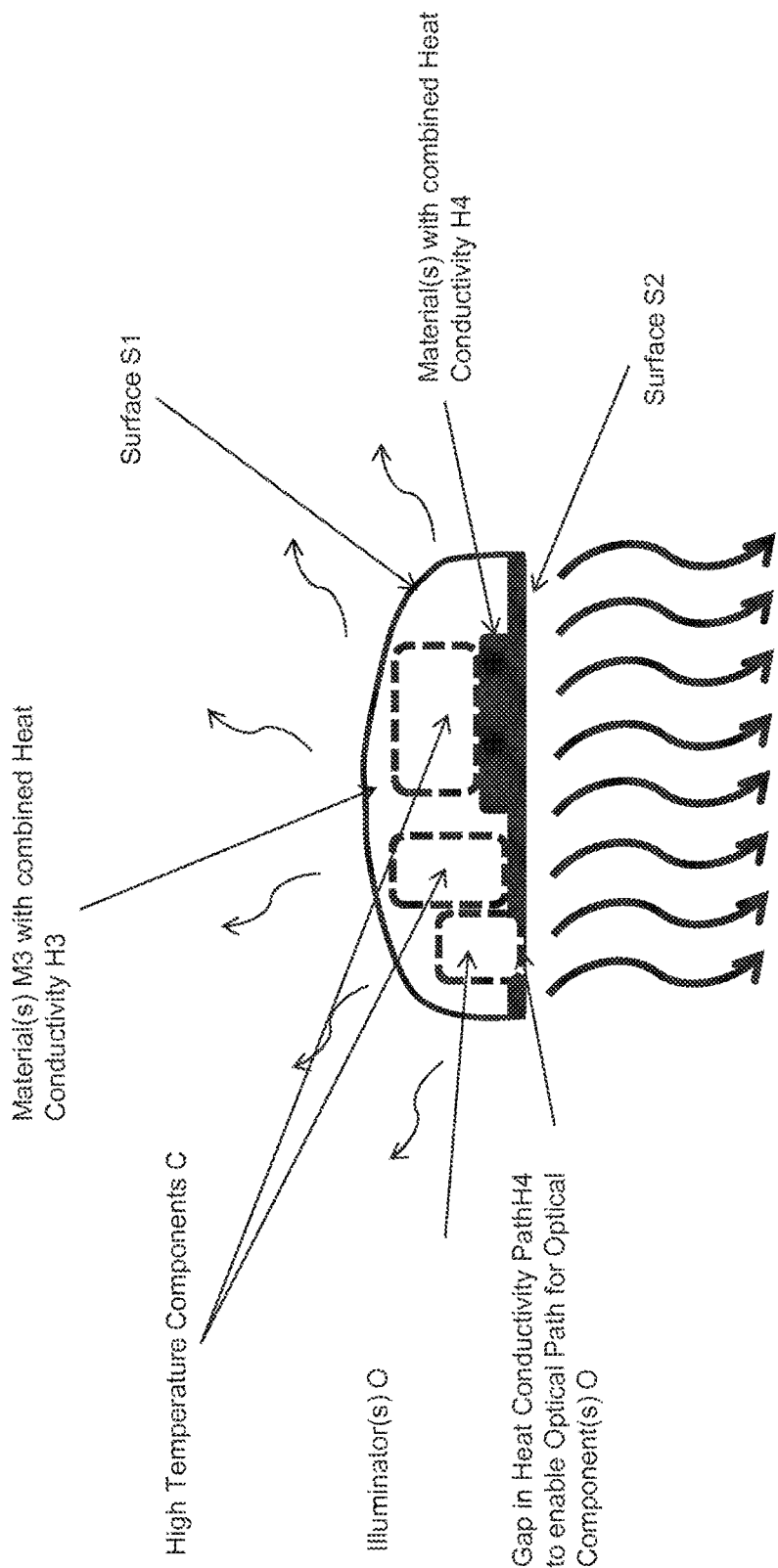
FIG. 21 shows the positioning of an infrared illuminator with respect to the thermal conduction paths from electronic components through thermally conductive materials to the outer surfaces of a handheld iris recognition device.
Figure 24:
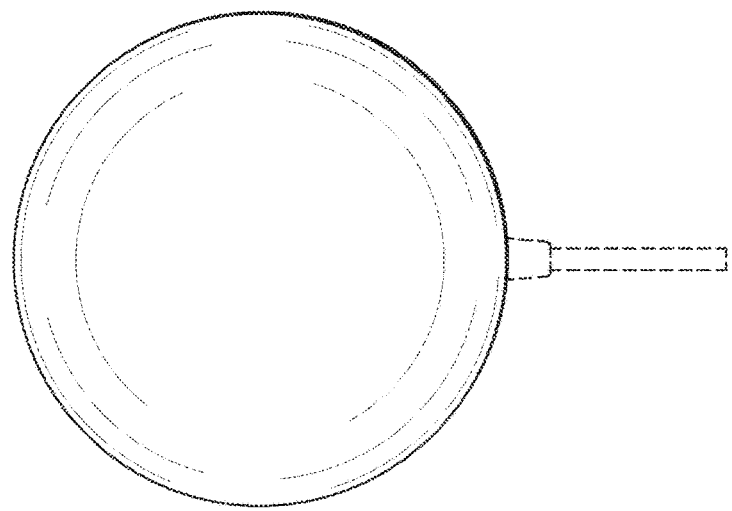
FIG. 24 is a top plan view of an exemplary iris imaging/recognition device according to embodiments of the present invention.
Figure 23:
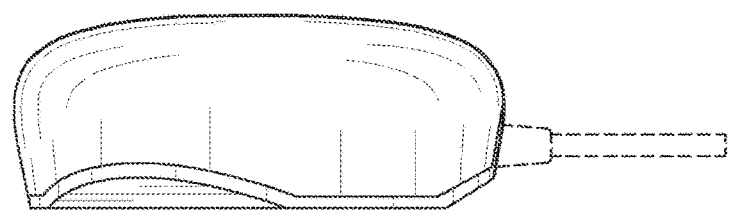
FIG. 23 is a left side elevational view of an exemplary iris imaging/recognition device according to embodiments of the present invention.
Figure 22:
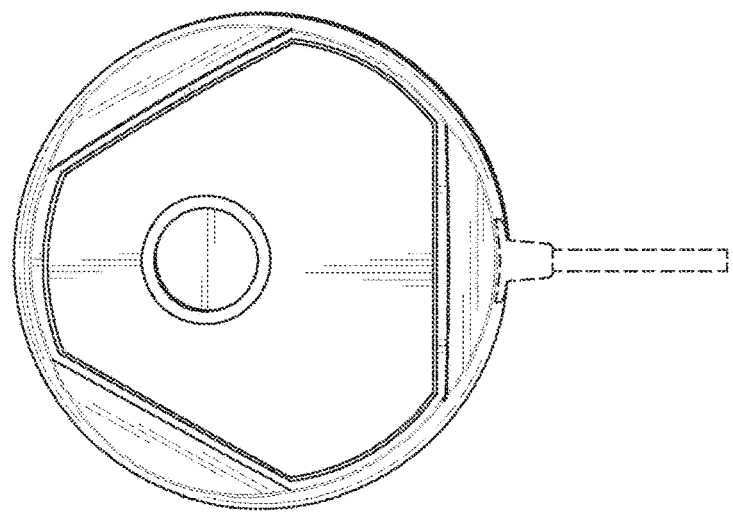
FIG. 22 is a bottom plan view of an exemplary iris imaging/recognition device according to embodiments of the present invention.
Figure 25:
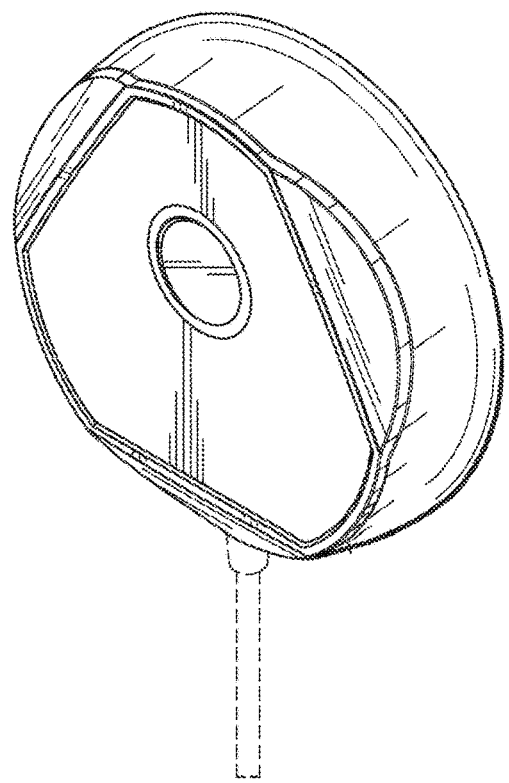
FIG. 25 is a bottom, front left side perspective view of an exemplary iris imaging/recognition device according to embodiments of the present invention.
Figure 26:
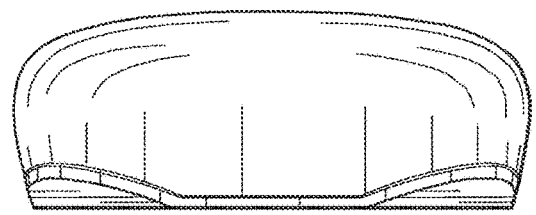
FIG. 26 is a front elevational view of an exemplary iris imaging/recognition device according to embodiments of the present invention.
Figure 27:
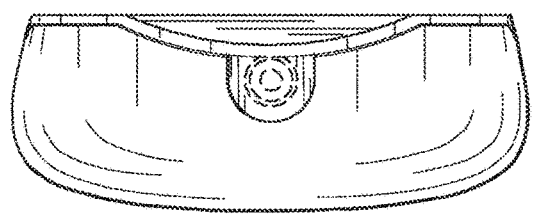
FIG. 27 is a rear elevational view of an exemplary iris imaging/recognition device according to embodiments of the present invention.

Another related aspect is shown in FIG. 20. In this aspect, materials M4 through which heat is conducted from powered and potentially hot components to the bottom surface S2 of the device may have a higher combined thermal conductivity H4 compared to that of materials M3 with combined thermal conductivity H3 through which heat is conducted to the top of the device. This may be implemented, for example, by using aluminum, steel or zinc or nickel-zinc that is in direct contact with hot components, and that conducts heat directly to surface S2. By comparison, heat is conducted to the top surface S1 by air or polystyrene, as examples, which have poor thermal conductivity compared to aluminum, steel or zinc or nickel-zinc, as examples. The combined effect is to direct heat away from the hand-held surface S1 and onto the other surface S2. Another related aspect is shown in FIG. 21. In this aspect, there are one or more small gaps in the heat conductivity path H4 to enable an optical path for the optical components in the iris recognition system, for example the camera and the infrared illuminators.

The illuminators direct light, typically infra-red illumination, at the user's irises. Light is reflected off the user's iris and into a camera sensor (e.g., a lens in optical communication with the sensor array) in the device. Since the camera needs to be pointed to the user's eyes and since the user is facing in a direction primarily parallel to the ground, then the device may acquire iris imagery and optionally perform iris recognition also when the camera in the device is pointed in a direction primarily parallel to the ground. The shortest range that a young human can focus at and therefore observe clearly the visual appearance guides (fiducial marks) on the bottom of the device is approximately 2.5 inches. In one aspect therefore, it is desirable that the user position the device at least at this distance from their eyes. In older users, this distance may increase. In one aspect, the camera may be focused to acquire iris imagery between 2.5 inches and infinity. In another aspect, the camera may be focused to acquire iris imagery between 4 inches and infinity. In another aspect, the camera may be focused to acquire iris imagery between 6 inches and infinity. In another aspect, the camera may be focused to acquire iris imagery between 9 inches and infinity. In another aspect, the camera may be focused to acquire iris imagery between 4 inches and 15 inches In another aspect, the camera may be focused to acquire iris imagery between 6 inches and 12 inches. In another aspect, the camera may be focused to acquire iris imagery at 9 inches.

Iris Illumination for Iris Recognition

Imaging systems, including iris recognition systems, can comprise one or more cameras and one or more illuminators. Iris recognition systems in particular benefit from flash illumination, timed to be simultaneous with the camera exposure, because flash illumination can be sufficiently brief to permit high resolution imaging despite motion of the subject, and because the total energy used for a flash illumination can be substantially lower than is used for continuous illumination. Light-emitting diode (LED) illuminators are desirable as flash sources because they can be flashed at high power for brief periods with high efficiency. Imaging for iris recognition may be accomplished using LEDs that emit at near-IR wavelengths, typically in the range of 700-900 nm. Many IR LEDs are available emitting at 850 nm; other wavelengths, including 780 nm and 810 nm, are also available. Manufacturers of strong IR emitters include Vishay, Osram, LED Engin, Epitex, and others.

A camera used for iris recognition typically includes a combined lens and image sensor assembly that can image at least a region of the face that includes one or both eyes. This imaging is preferably at high resolution, with the iris image subtending at least 100 pixels on the image sensor. It can be convenient for the camera to be positioned near the subject at a distance of 6-18 inches, although longer or shorter distances can be used as well. A typical distance is about 9" or 12", but the principles disclosed herein apply to other distances, with all dimensions being properly scaled.

It is convenient to locate the illuminators within the same enclosure as the cameras. However, if the illuminators are located immediately adjacent to the camera, light from LEDs in such a position can pass through the iris to the retina and be reflected back to the camera, producing a red eye effect as commonly seen in candid photography. Also, light can be reflected specularly from eyeglasses. Because both the red-eye reflections and the specular reflections can obscure iris images, illuminators are typically spaced away from cameras in iris recognition systems. The angle between an illuminator and camera, as measured at the subject, should be at least 6°, and can be larger, e.g., 10° or 20° or 25°, to further reduce the interference of specular eyeglass reflections on the acquired iris images. This may translate to distance between the camera and the illuminator of 2" to 6" for a 12" iris distance.

To constrain the costs of producing systems containing image sensors and LED illuminators and other electronic components, the components may be mounted on the same printed circuit board (PCB). While it is possible to mount image sensors or LEDs on separate PCBs, such mounting involves added costs of producing multiple boards, electrical connectors, cables, mounting components, etc. Substantial cost savings can be achieved by mounting all components (or at least the LED(s) and the image sensor) on the same PCB.

Mounting LED illuminators on the same board as the cameras, or at least on the same geometrical plane, but spaced from the cameras as reduces or eliminates deleterious reflections, e.g., from eyeglasses or retinas, presents a problem of properly directing the LED illumination toward the face being imaged. The optic axis of surface-mount LEDs attached by automated equipment is inevitably normal to the PCB surface. The nature of this problem is that, because the LED is offset from the camera by an angle between, say, 6° to 25° as seen from the face, the peak emission does not fall on the face and eye of the subject being illuminated, but rather is directed off to the side.

The issue can be especially acute when, as is otherwise desirable, the emission from the LED is focused into a beam. LEDs are commonly manufactured with molded lenses that concentrate the emitted light within a specified emission angle about the optic axis. Commercial LEDs are available with a variety of emission angles, from sharp angles as small as ±2° to nearly Lambertian emission (±90°). Common emission angles include ±45°, ±22°, ±18°, and ±10°, where the indicated angle is that where the emission intensity drops to ½ its value along the optic axis. For example, if it is desired to image a face with a total field of view of 25°, then this field is best illuminated with an LED that projects into a ±12.5° field. However, to reduce effects of undesirable reflections as discussed above it is desirable to set the LEDs at least 6° away from the axis. If the LEDs are attached to the same PCB as the sensor, or at least are in the same plane, then their optic axes are parallel to the sensor axis, and this 6° offset concentrates the light toward the periphery of the sensor field. With the illumination concentrated on one side of the image, the opposite side is poorly illuminated.

Although it is otherwise desirable to use LEDs with molded lenses that focus the beam, commercially available LEDs with optimal emission characteristics may not be available with the desired emission angles. For example, Osram manufactures high-power LEDs, designated SFH4715S, rated to emit a total flux of about 1 W at an excitation of 1 A, but into a ±45° angle, and they manufacture a similarly high-powered LED, designated SFH4790S, that emits into a ±10° angle. As another example, LED Engin manufactures high-power LEDs, designated LZ4-00R400, that are rated to emit a total flux of about 2 W when excited at 0.7 A, but also into a ±45° angle. Similarly high powered LEDs that emit into different angles are not generally available. If a particular emission angle is to be obtained, a means can be used to form that emission angle from beams with available emission angles.

Embodiments of the present technology reduce, eliminate, or avoid these problems by enabling effective LED illumination of the camera field despite mounting the LEDs on the same plane as the image sensor, with optical axes parallel to each other, and positioned with a significant offset of the LED to one side of the image sensor, and also of providing effective concentration of emission from a wide-field emitter onto a field of limited area.

To accomplish the concentration of light, a lens can be positioned just beyond the LED. Fresnel lenses are preferred to solid lenses in this application because they are thinner, lighter, and so both easier to mount and of lower cost. Molded Fresnel lenses are available from various companies, including Fresnel Technologies Inc., Nihon Tokushu Kogaku Jushi Co. Ltd. and Itabashi-ku, with a range of focal lengths including focal lengths between 3 mm and 30 mm.

With a focal length of 15 mm, a Fresnel lens positioned a short distance, e.g., less than 15 mm, beyond the LED forms a magnified virtual image of the LED behind the actual LED position and concentrates the emission into a smaller angle than the actual emission. For example, to form an angle of ±18° from emission at ±45°, the magnification should be −tan(45°)/tan(18°)=−3. The magnification is negative because the image is virtual (that is, the magnified image appears on the same side of the lens as the object). If f is the lens focal length and dL is the distance from the lens to the LED, then the distance from the lens to the image, di, is determined by the lens equation, $$1/f = 1/dL + 1/di$$

Also, the magnification M is related to these quantities by $$M = di/dL.$$

It can be shown algebraically that $$M = f/(dL-f)$$

and $$dL = P(1+1/M).$$

So a magnification of −3 is obtained with a 15 mm focal length lens if the distance dL from the LED to the lens is 10 mm. If a lens with a shorter focal length is used, it should be positioned correspondingly closer to the LED.

In any given case, the exact placement of a real lens, relative to an LED, to obtain this magnification depends on various factors not considered here such as the thickness of the lens, and the details of the LED lens, if any. The design principles, however, remain as stated.

Figure 29:
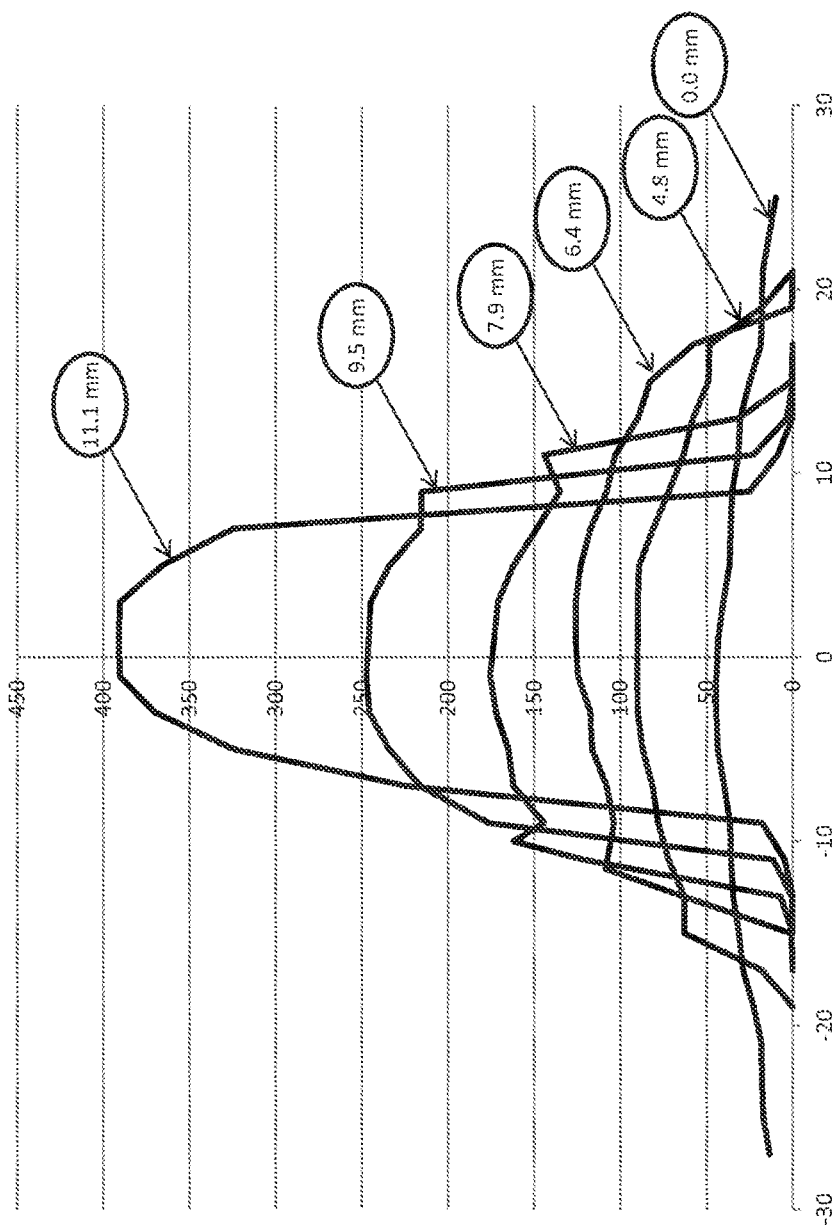
FIG. 29 is a plot of the intensity from a wide-angle LED measured in a plane 12" distant from the LED with no lens (bottom trace) and with a 15 mm focal length Fresnel lens positioned at different distances from the LED printed circuit board (PCB) (upper traces).

By way of example, light distribution from a wide-angle LED was measured along a line in a plane 12" distant from the LED, both with no lens and with a 15 mm focal length Fresnel lens positioned at different distances from the LED PCB. Examples of these LEDs may include LED Engin LZ4-00R400, Kingbright APT2012SF4C-PRV, Osram SFH4715S and Osram SFH4232 A. The results are indicated in FIG. 29. It can be seen that as the lens is moved away from the LED, the light is concentrated into a successively narrower distribution with successively increasing intensity.

These results show the expected ability to reduce the width of a projected LED beam to a desired value by placing a lens in front of the LED at the proper distance.

It may be further desired to concentrate the light in the center of the sensor field, which is significantly offset from the LED axis. This is done by positioning the axis of the LED not at the center of the lens, but away from the center. In other words, the LED may be positioned such that its optical axis is parallel to the optical axis of the lens (e.g., as in FIG. 34) or intersects the optical axis of the lens (e.g., as in FIG. 33.) The optical axes may intersect at a point between the LED and the lens, at a point on the far side of the LED from the lens, or at a point on the far side of the lens from the LED. This causes the light to be concentrated onto the opposite side of the lens. So if the LED position is shifted away from the sensor, leaving the lens in a fixed position, the projected light will be moved toward the center of the field.

Figure 30:
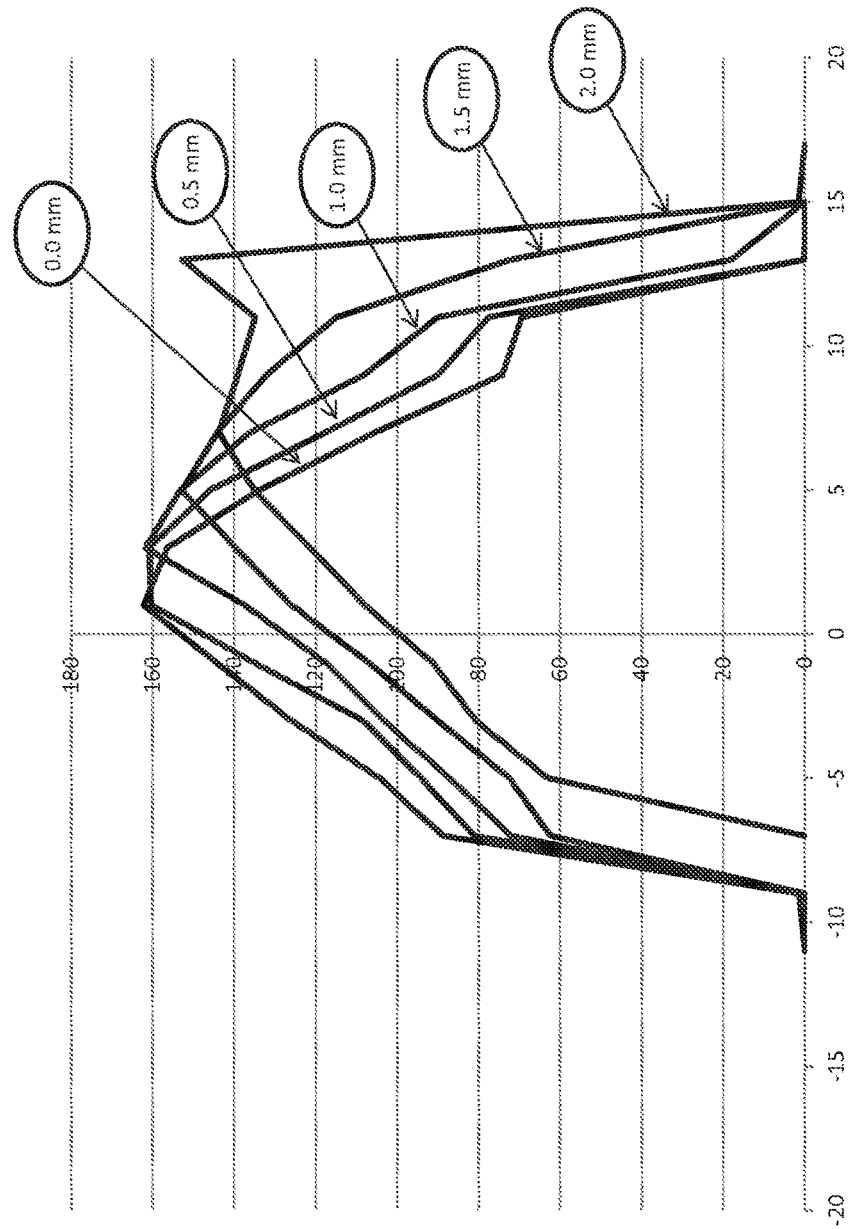
FIG. 30 is a plot of the intensity from an LED measured in a plane 9" from the LED with a lens having a 10 mm focal length positioned 4.3 mm from the LED PCB and offset from the LED's optical axis by different amounts.

In another example, FIG. 30 illustrates the effect of shifting the position of the LED axis relative to the lens axis. In this case an LED is used to illuminate a field at a distance of 9", and a lens with 10 mm focal length is positioned at a 4.3 mm distance above the lens substrate. The LED is located about 6 cm offset from the sensor axis, and it is desired to shift the projected LED light by this distance. The effect of offsetting the LED by different distances, up to 2.0 mm, is indicated. In this case an offset of 2.0 mm shifts the beam by the desired 6 cm, with only a slight change in beam width.

It can be noted in FIG. 30, however, that the beam offset, caused by moving the LED axis away from the lens axis, also causes the projected spot to be asymmetric, more heavily concentrated in the side away from the LED. This asymmetry is undesirable because it produces deficient illumination in one part of the image and excessive illumination in another part.

Figure 31:
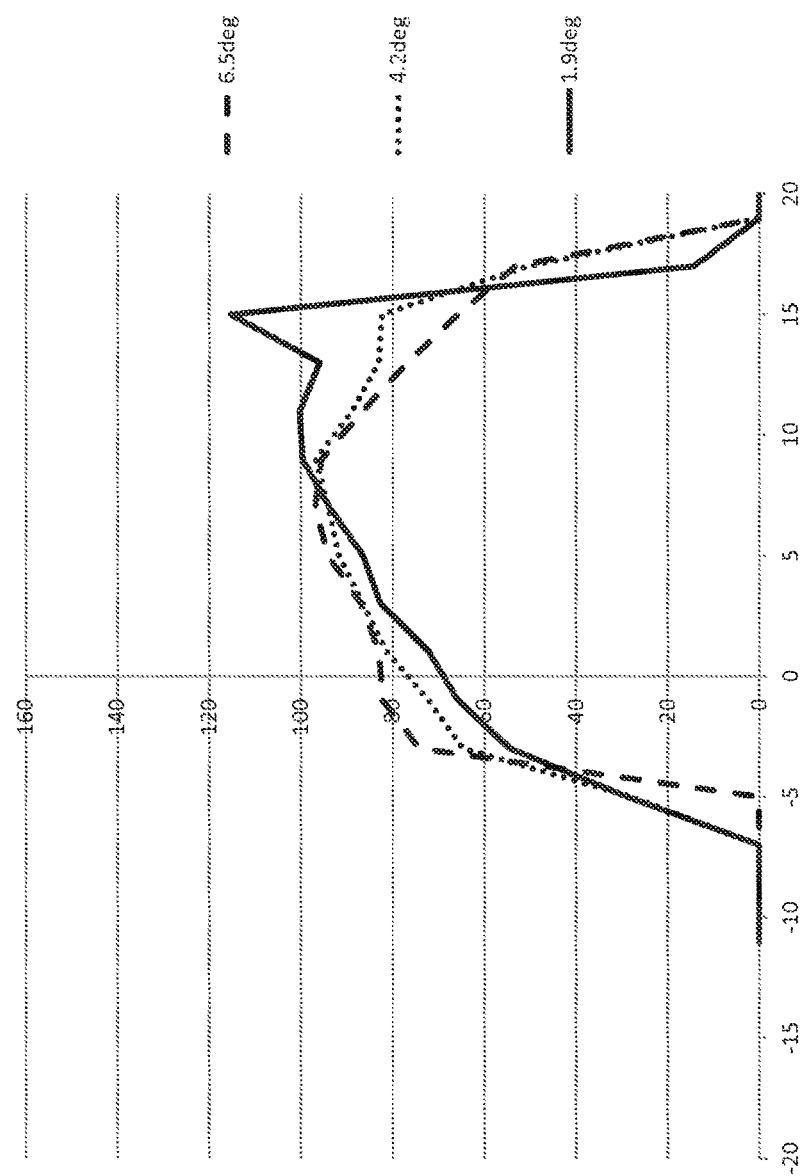
FIG. 31 is a plot of the intensity from an LED measured in a plane 9" from the LED with a lens having a 10 mm focal length positioned 4.3 mm from the LED PCB, offset by 2.5 mm relative to the LED, and tilted toward the sensor at various angles.

To correct this asymmetry, the lens is tilted about the horizontal axis that crosses the axis connecting the LED and sensor. In the example of FIG. 31 the LED is offset by 2.5 mm relative to the lens which is positioned about 4.3 mm above the LED and tilted toward the sensor at various angles, as indicated. It can be seen that as the tilt is increased from 1.9° to 6.5°, the dominance of the emission shifts from the right side, in this case the side opposite the LED, toward the left side.

Figure 32:
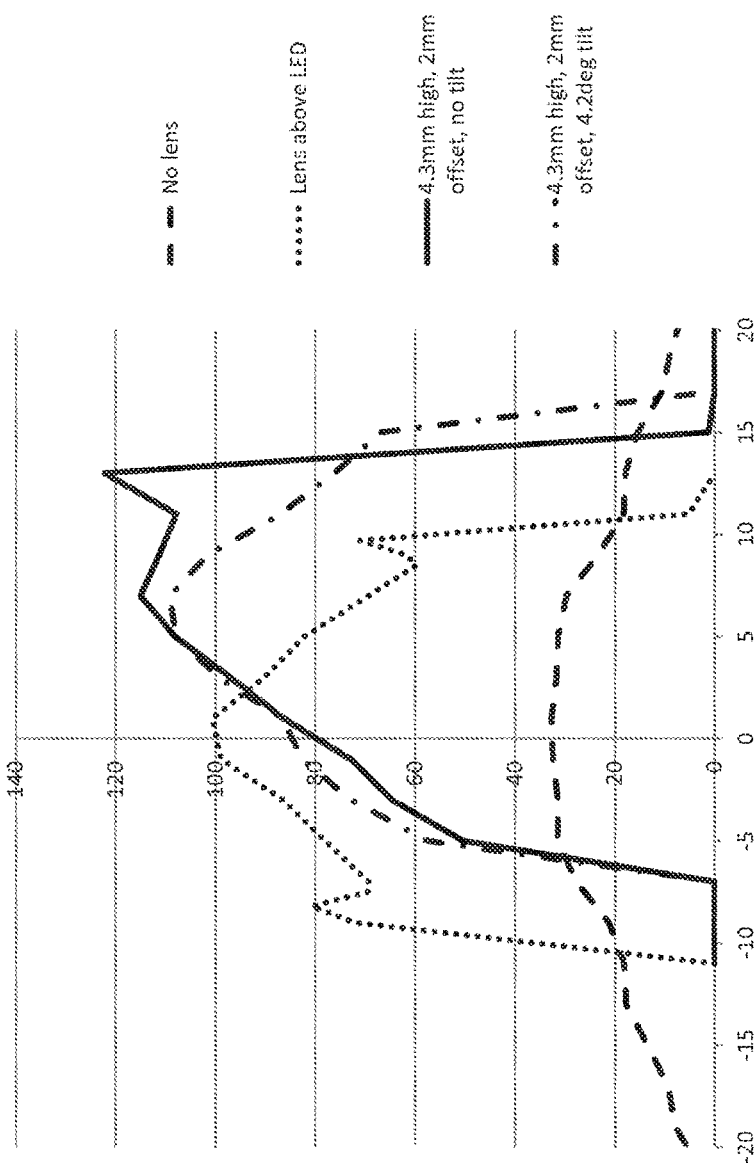
FIG. 32 is a plot of the intensity from an LED measured in a plane 9" from the LED with various combinations of lens positions and tilts.

The effects of procedures disclosed herein are summarized in FIG. 32. Here the dashed trace shows the distribution of the projected LED illumination, the horizontal axis showing the position relative to the LED axis. The light has a broad but low-level distribution. The dotted trace shows the effect of positioning a 10 mm focal length Fresnel lens 4.3 mm directly above the LED: the illumination becomes narrower but more intense. The solid trace shows the further effect of positioning the LED axis 2 mm off-center relative to the lens: the illumination is projected about 6 cm to one side and is distributed more heavily to the far side. The dash-dot trace shows the further effect of tilting the Fresnel lens by 4.2° toward the far side: the illumination remains about the same intensity and width but becomes essentially symmetric in its distribution.

In these experiments the active side of the Fresnel lens was positioned to face away from the LED. In our experience this produces a flatter top to the illumination, considered desirable because it more closely approximates a uniform distribution. Alternately the active face of the lens could be positioned toward the LED. In this orientation the lens would be located and tilted differently to achieve the same light distribution, but the means of achieving an offset and symmetric distribution to the illumination remains the same. Also, in this latter case, the distribution tends to form a sharper peak.

Figure 33:
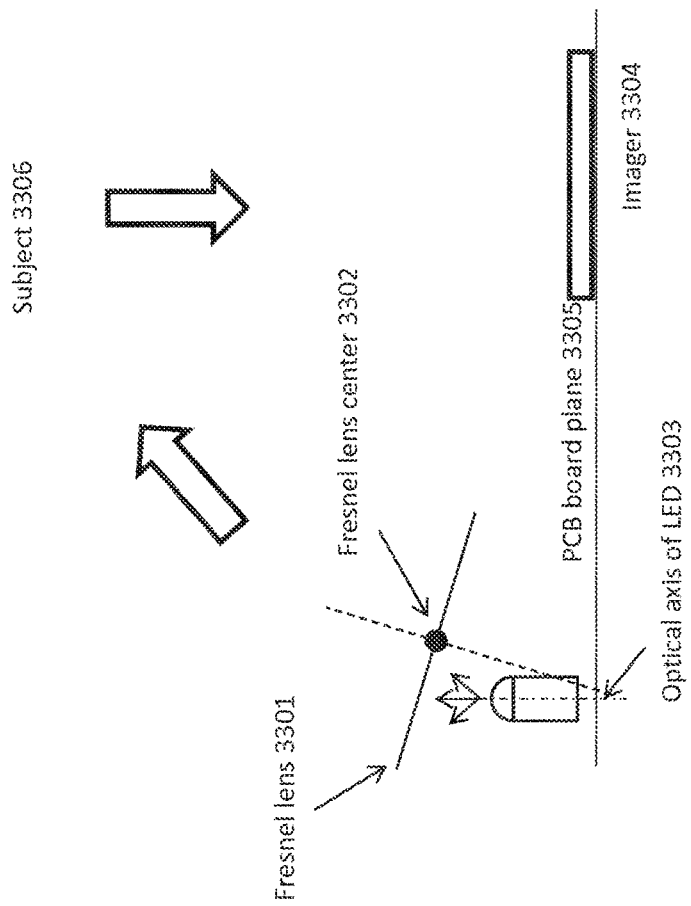
FIG. 33 is a diagram of an iris imaging apparatus with a Fresnel lens mounted with its optical axis at an angle with respect to the optical axis of an LED illuminator.

In one embodiment shown in FIG. 33, an illuminator may be positioned so that its primary axis 3303 is parallel to the primary axis of an imager 3304, and positioned to one side on a PCB board plane 3305. A Fresnel lens 3301 may be positioned in front of the illuminator so that the center 3302 of lens is offset from the optical axis 3303 of the illuminator. This offset may be in the same direction as the position of the subject 3306 being illuminated. This first arrangement may produce an illumination gradient at the subject 3306 in a first direction. The Fresnel lens 3301 may then be tilted in a direction towards the subject. The tilt component may produce a second illumination gradient in a second direction that is opposite to the first direction, such that the sum of the first illumination gradient and the second illumination gradient may provide a more even illumination gradient at the subject compared to the first or second illumination gradients alone.

Figure 34:
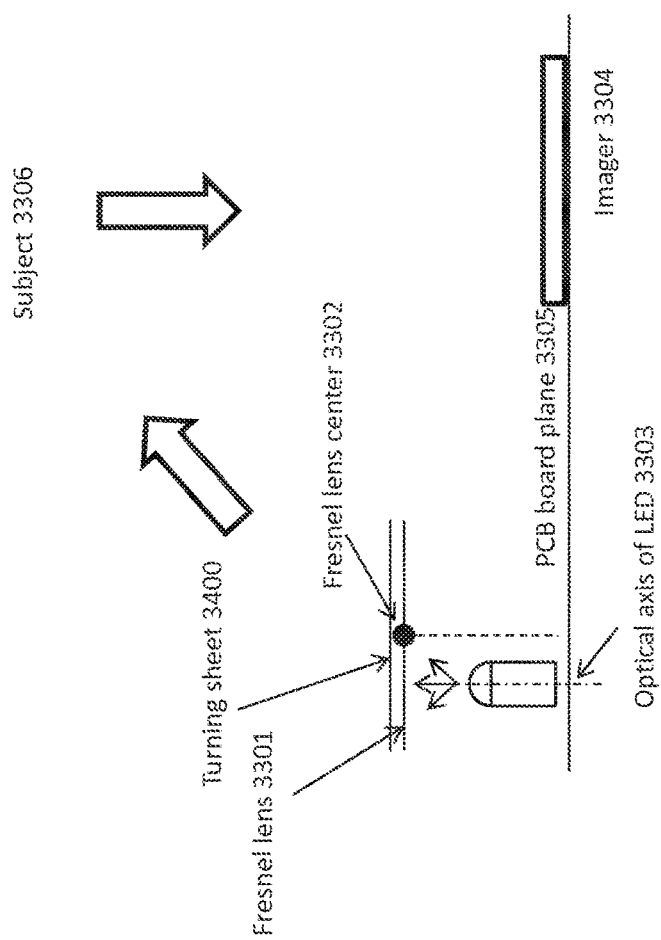
FIG. 34 is a diagram of an iris imaging apparatus with a Fresnel lens and turning sheet mounted with their optical axes offset with respect to the optical axis of an LED illuminator.

In another embodiment shown in FIG. 34, an illuminator may be positioned so that its primary axis 3303 is parallel to the primary axis of an imager 3304, and positioned to one side on the PCB board plane 3305. A Fresnel lens 3301 may be positioned in front of the illuminator so that the center 3302 of lens is offset from the optical axis 3303 of the illuminator. This offset may be in the same direction as the position of the subject being illuminated. This first arrangement may produce an illumination gradient at the subject in a first direction. A turning sheet 3400 or other means of re-directing the direction of illumination towards the subject 3306 may be placed in front of or behind the Fresnel lens 3301. This re-direction component may produce a second illumination gradient in a second direction that may be opposite to the first direction, such that the sum of the first illumination gradient and the second illumination gradient may provide a more even illumination gradient at the subject compared to the first or second illumination gradients alone. The use of the re-direction component may allow a smaller height between the PCB board plane 3305 and the outer edge of either Fresnel lens or re-direction component in order to minimize the thickness of the assembly.

Figure 35A:
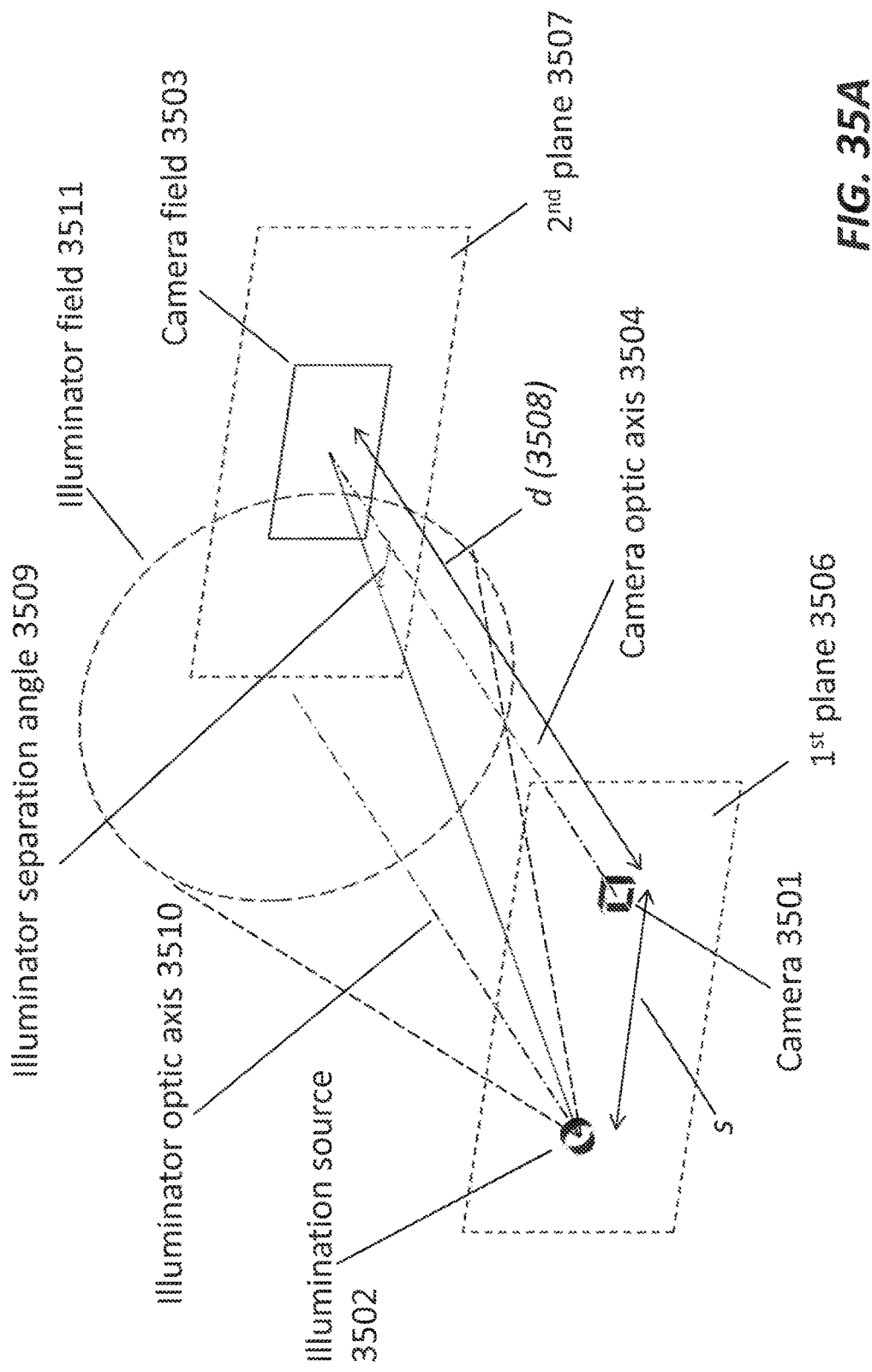
FIG. 35A illustrates the overall geometry of an illumination system for an iris recognition device.

With reference to FIG. 35A, an iris identification optical system comprises a camera 3501 and an illuminator 3502. The camera 3501 includes a lens and a sensor (not shown), said lens disposed with respect to said sensor to view a camera field 3503 and focus an image of said field onto said sensor. If the camera 3501 is properly assembled, a line connecting the center of said camera field and with the center of said image passes through the center of said lens and constitutes the optic axis 3504 of said camera and is perpendicular to the plane 3506 of the sensor. The sensor can be attached to a printed circuit board, with the plane of the sensor parallel to the plane of the printed circuit board, indicated in FIG. 35A as the 1st plane 3506. The camera field 3503 lies substantially in a 2nd plane 3507, labeled in FIG. 35A, which is parallel to the 1st plane 3506. The actual field 3503 may not be strictly planar but can be slightly spherical, or even aspheric, due to lens optical imperfections such as field curvature.

The preferred size of the separation d between the 1st and 2nd planes depends on the intended application. For a handheld device d 3508 is typically in the range of 100 mm to 500 mm. For a wall-mounted or portal device d is typically in the range of 250 mm to 1200 mm.

Proper operation of the system can include illumination of this camera field. In an iris recognition system this illumination is typically accomplished by one or more LEDs. A single LED illuminator is illustrated in FIG. 35A. LEDs comprise a semiconductor surface that emits light upon passage of an electrical current across layers disposed on that surface, said light being emitted with a Lambertian angular distribution; that is, the concentration of light is symmetrically distributed about an axis passing through the center of the emitter and has an angular distribution of intensity that is proportional to the cosine of the angle to this optic axis. Thus light emitted at an angle of 60° to the axis has an intensity equal to ½ that of light emitted along the axis, and the light distribution is said to have an emission angle of ±60°, which can also be expressed as a full-width half-maximum (FWHM) angle of 120°.

Figure 35B:
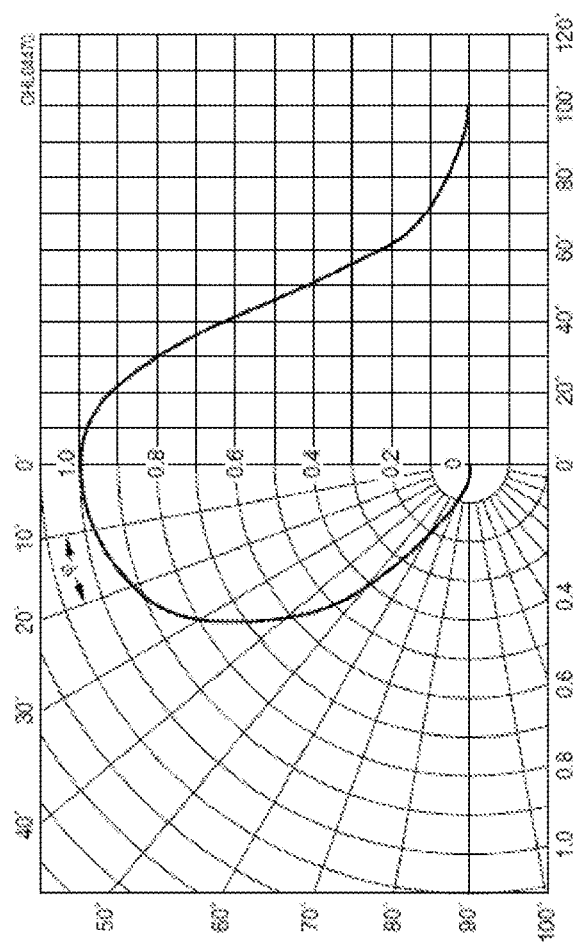
FIG. 35B is a plot of the angular dependence of light distribution from a typical LED used to provide illumination for iris recognition as shown in FIG. 35A.

LEDs can be supplied in packages that include a molded plastic lens and/or reflective elements that concentrate the emitted light into a sharper angle. LEDs are readily available with emission angles of ±45°, ±22°, ±18°, and ±10°. For example, an Osram SFH4715S LED has a specified angular distribution of intensity, shown in FIG. 35B, that drops to one-half its peak intensity at an angle of ±45°. Within smaller angles the intensity drops by a smaller amount; for example in the plot of FIG. 35B it is seen that within an angle of about ±30° the intensity is within 80% of its peak value.

For proper operation of iris recognition systems it is desirable that the illumination source 3502 be positioned away from the camera axis 3504 to avoid undesirable reflections. Reflection of light from the retina in a manner that resembles "red-eye" in common photography and so interferes with the iris recognition occurs if the light source lies within about ±6° of the camera optic axis. Specular reflections from eyeglass can occur at larger angles, so to avoid them illuminators are spaced at greater separations of 10°, 20°, or more. This angle is labeled as the illuminator separation angle 3509 in FIG. 35A.

In the prior art, the illuminators are typically positioned suitably away from the camera and pointed at the camera field. However, using LEDs in this manner requires that they be mounted on a circuit board that is similarly disposed at the illuminator separation angle relative to the camera PCB and the 1st plane of FIG. 35A. Such a mounting precludes the possibility of mounting the LED on the same PCB as the camera, desirable for reducing cost. This invention addresses the need to mount the LED on the same PCB as the camera, and illustrates this feature in FIG. 35A where an illumination source is indicated within the same 1st plane as the camera, and with its optic axis 3510 perpendicular (normal) to this plane and therefore parallel to the camera optic axis 3504.

However, in general this arrangement introduces two problems: (1) the size of the illuminated field is different from the size of the camera field, and (2) the illumination is not projected onto the camera field. The first problem is addressed first.

To avoid wasting light and thereby reducing power consumption and minimizing the total light energy required, it is desirable that the useful portion of the light projected by the illuminator 3502 be of about the same size as the camera field 3503, e.g., the "useful portion" can be the area over which the variation of light intensity is within some preferred maximum value which might be ±10%, ±20%, or of some other value depending on the sensitivity of the detection and image processing system to such variations. The illuminator field 3511 shown in FIG. 35A is indicative of the radius of illumination, at the 2nd plane containing the camera field 3503, within which the variation of light intensity is acceptable to system operation. In the case of LEDs that emit with large angles, such as ±45° or ±60°, the illuminator field 3511 can be substantially larger than the camera field 3503. In the case (not shown) of LEDs that emit with small emission angles, such as ±10° or ±2°, the illuminator field 3511 can be substantially smaller than the camera field 3503. Except in the unique case wherein the illuminator field 3511 is the same size as the camera field 3503, it is desirable, and sometimes necessary, to focus the illuminator light so that the illuminator field 3511 is of substantially the same size as the camera field 3503.

Figure 36:
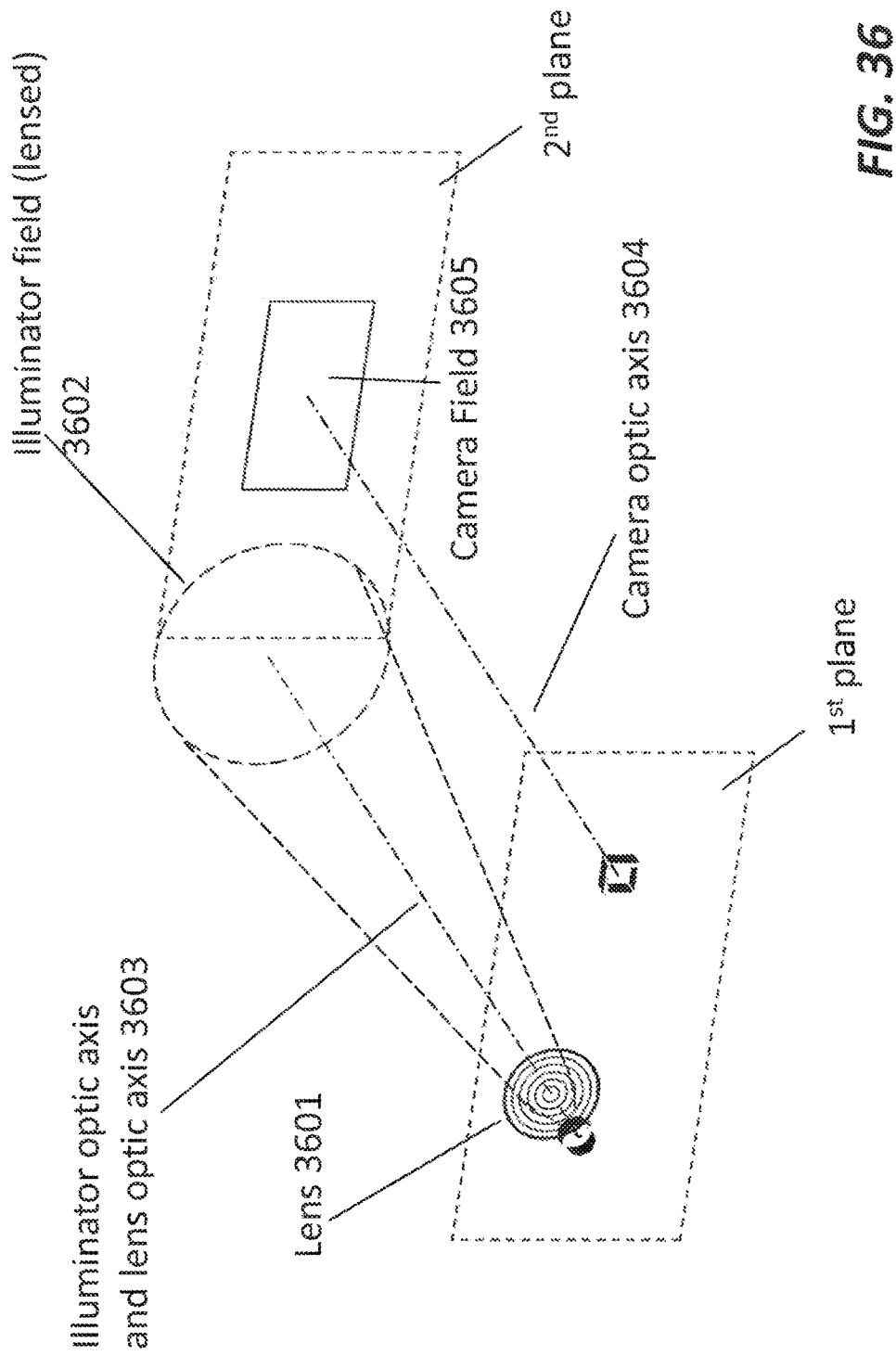
FIG. 36 illustrates the use of a Fresnel lens to focus LED illumination to a field of the desired size.

To this end, referring to FIG. 36, a lens 3601 is positioned in front of the illuminator. Because in this example the lens 3601 is intended to reduce the size of the field 3602, and thereby increase the peak illumination intensity, a concave lens of positive focal length is used, and is positioned in front of the LED at a distance $d_L$ that is less than said focal length. It is practical to use a Fresnel lens. The preferred magnitudes of the lens focal length and of the distance $d_L$ depend on details of the system, including the size of the system and angle of emission of the LED. For a system with 300 mm distance between the camera and the camera field, a convenient spacing $d_L$ might be between 1 mm and 30 mm. Depending on the relative sizes of the illuminator field and the camera field, an appropriate value for the lens focal length can be estimated using the well-known lens equation. The focal length is normally larger than the spacing $d_L$, so that the lens forms a virtual image of the LED behind the 1st plane because this results in a thinner system than one that forms real images of the illuminator. Example values can be between 3 mm and 50 mm.

If the LED produces an illumination field smaller than desired, a convex lens, of negative focal length, would be used. The desired lens focal length and distance $d_L$ depend on the nature of the LED and the size of the system.

The second problem mentioned above can be addressed as follows. The configuration of FIG. 36 succeeds in forming a beam with the desired illuminator field, but the field is not centered on the camera field as desired. Means of moving the illuminator field 3602 away from the illuminator optic axis 3603 and towards the camera optic axis 3604 onto the camera field 3605 is now described.

Figure 37:
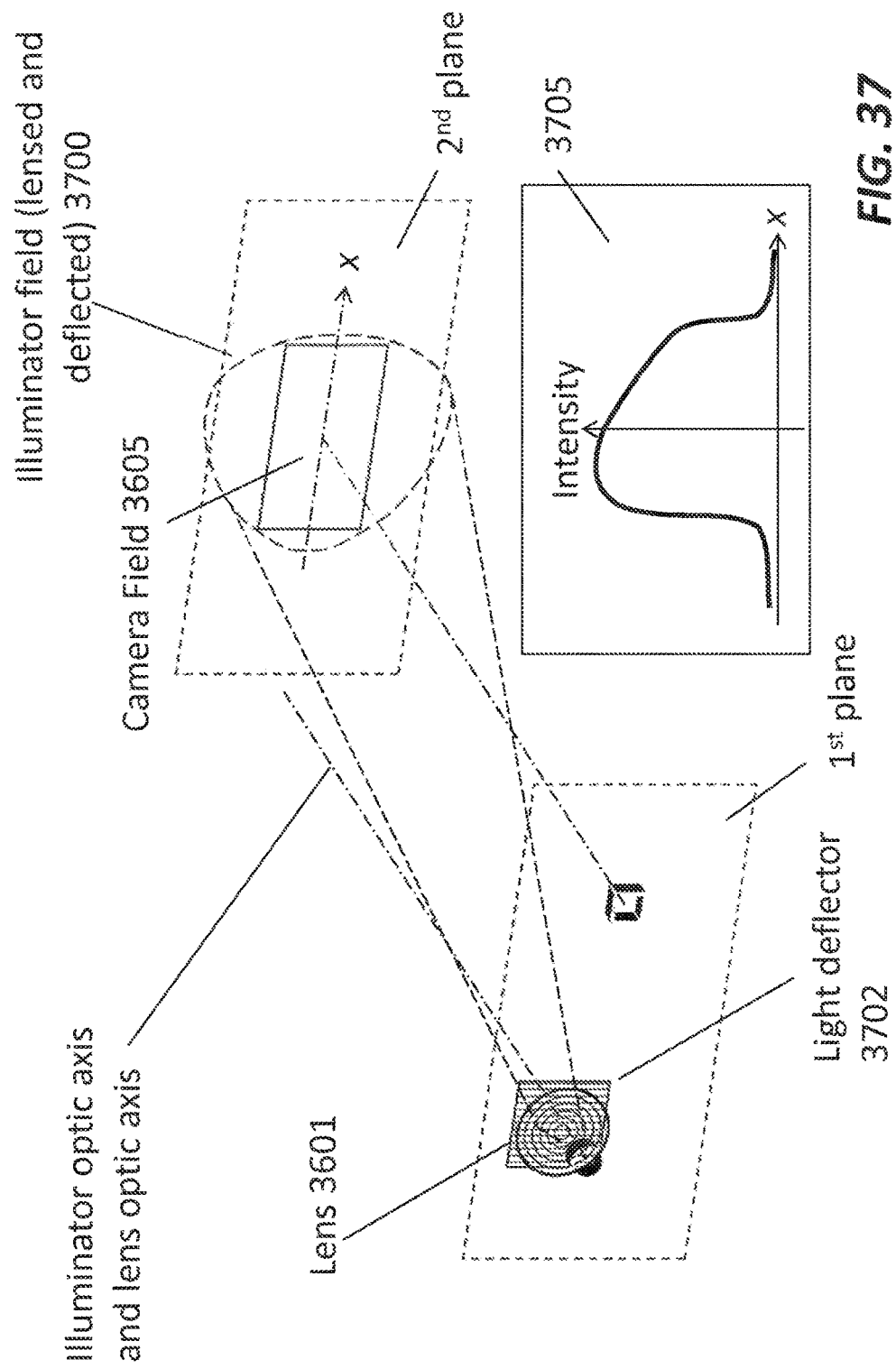
FIG. 37 illustrates the use of a light deflector (e.g., a Fresnel prism) to shift the position of the projected illumination field so that it overlaps the camera field, with an inset showing the resulting distribution of intensity across this image.

With reference to FIG. 37, a first means of centering the illuminator field 3700 on the camera field comprises the addition of a light deflector 3702 proximate to the Fresnel lens 3601. Such light deflectors 3702 can comprise an array of prisms cut or molded into an optic surface, or diffractive elements molded or embossed on an optic surface. For example, prism arrays can be supplied commercially by Fresnel Technologies, Inc. of Ft. Worth, Tex., and by Nihon Tokushu Kogaku Jushi Co. Ltd. of Tokyo, Japan. Diffractive beam deflectors can be supplied commercially by Luminit, Inc. of Torrance, Calif. The angle of deflection is preferably the illuminator separation angle shown in FIG. 35A. For a system with a 300 mm separation between the camera and the camera field, and with a 109 mm separation between the camera and the LED, this angle is 20°. In other systems this angle might desirably be between 6° and 30°.

The deflector 3702 can be mounted either between the Fresnel lens 3601 and the LED, or, preferably, on the side of the Fresnel lens opposite from the LED. For matters of practical mounting and to provide a thin system the Fresnel lens and the deflector can be positioned in close proximity or in contact. If desired, a single element can be fabricated with a Fresnel lens embossed or molded on one side of a sheet of plastic and a prism or diffractive deflector molded on the opposite side, thereby combining the two elements into a single part.

As shown in FIG. 37, when the illuminator field 3700 deflected onto the camera field 3605, it no longer has a symmetric configuration about the center of the field. The region of the illuminator field 3700 closer to the LED is more intense than the region farther from the LED, both because the intensity varies with this distance and because the efficiency of prism deflectors is reduced with increased angle of incidence in the direction of deflection. This asymmetry is further illustrated by the inset 3705 in FIG. 37, which shows the shape of the intensity of light projected in this manner. In this inset, the curve is a plot of intensity distribution along the x axis, this axis being the intersection of the plane containing the camera optic axis and the illuminator optic axis. The exact shape of this distribution depends strongly on the characteristics of the various system components, but in general the intensity is concentrated in an undesirable manner on the side of the field toward the illuminator. A symmetric illuminator field 3700 is desired.

Figure 38:
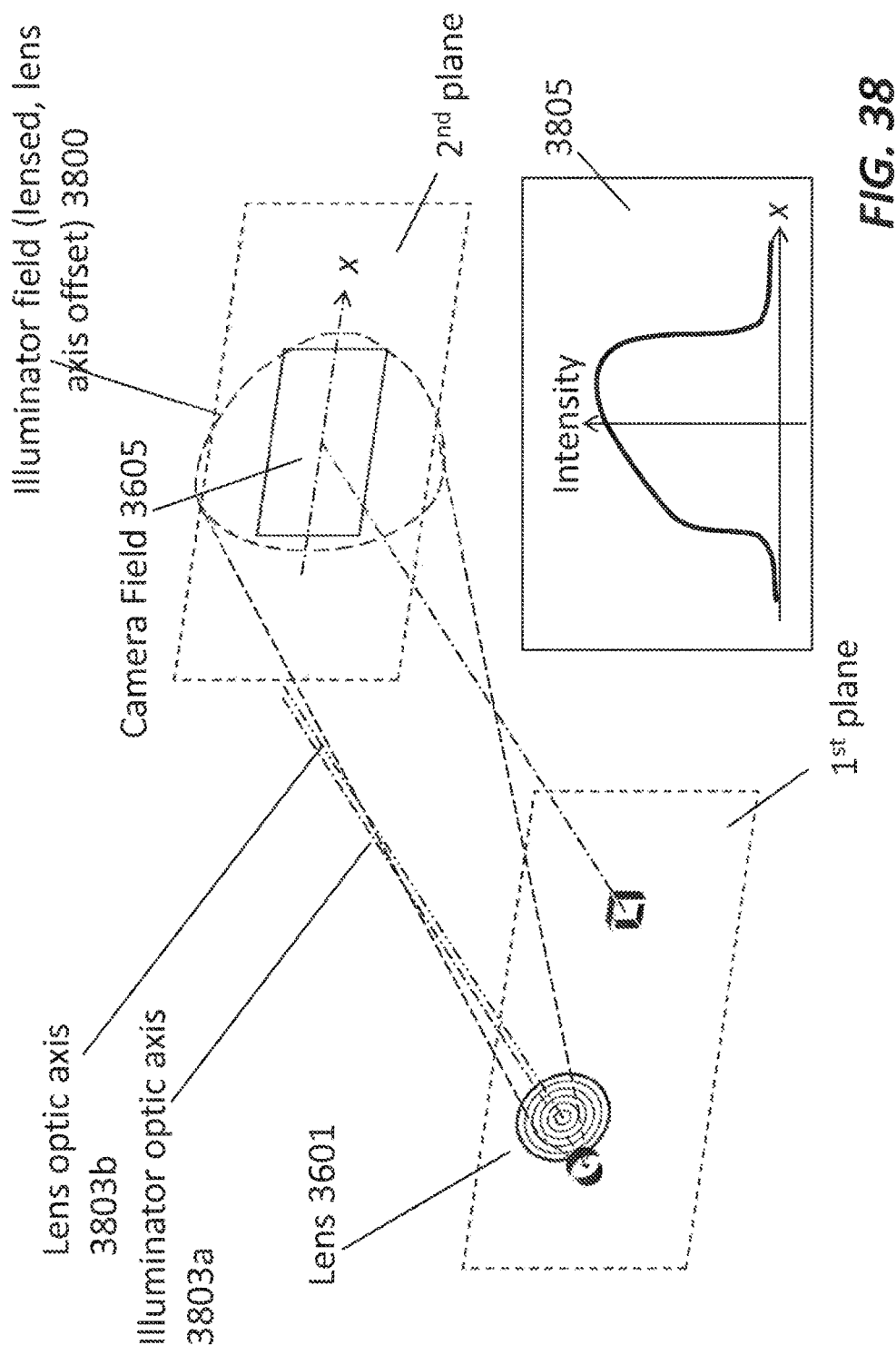
FIG. 38 illustrates repositioning the lens to shift the position of the projected illumination field so that it overlaps the camera field.

With reference to FIG. 38, a second means of centering the illuminator field 3800 on the camera field comprises positioning the axis 3803b of the Fresnel lens 3601 away from the LED optic axis 3803a, toward the camera, while maintaining its axis parallel to the LED axis. This shift causes a proportional shift of the projected illuminator field 3800 toward the camera field. When desirably positioned, the illuminator field 3800 overlaps the camera field 3605. This proper position is approximately the position where the center of the Fresnel lens falls on the line connecting the LED with the center of the camera field, as drawn in FIG. 35A. However, slight deviations from this position can be expected in practice as a result of LED focusing properties and effects of lens thickness. In a system wherein the camera and camera field 3605 are separated by 300 mm and the camera and lens are separated by 100 mm and the separation between the lens and the LED is 10 mm, if the lens is positioned 10 mm beyond the LED, the preferred shift in lens axis position is about 3 mm.

As indicated in FIG. 38, when the Fresnel lens 3601 is shifted the projected image is no longer circular, but becomes an asymmetric oval. This occurs because the side of the Fresnel lens 3601 away from the LED, being at a greater distance than the center, tends to concentrate the light to a smaller radius than does the area of the Fresnel lens at the center or near the LED. This concentration of light on the side of the illuminator field 3800 in the direction of deflection has a greater intensity than at the center of the illuminator field. Similarly, because the portion of the Fresnel lens 3601 near the LED is closer to the LED, it does not concentrate the light it projects on the illuminator field as much as does the center portion of the Fresnel lens or the more distant portion. As a result, the near side of the illuminator field 3800 is larger in extent and less intense in brightness than the center or the distant side. This asymmetry is further illustrated by the inset 3805 in FIG. 38, which represents the shape of the intensity of light projected in this manner. In this inset 3805, the curve is a plot of intensity distribution along the x axis, corresponding to the x axis of FIG. 37. As with the system of FIG. 37, the exact shape of this distribution depends strongly on the characteristics of the various system components, but in this case the intensity is concentrated in an undesirable manner on the side of the field away from the illuminator. This difference in intensity between the near and far side of the illuminator field, and so of the camera field, is undesirable. A symmetric distribution of light is preferred.

It is noted that the two different methods of positioning the illuminator field over the camera field result in asymmetric light distributions of opposite direction: the light deflector causes the light to be concentrated on the side near the LED, but the repositioning of the Fresnel lens causes the light to be concentrated on the more distant side from the LED.

Figure 39:
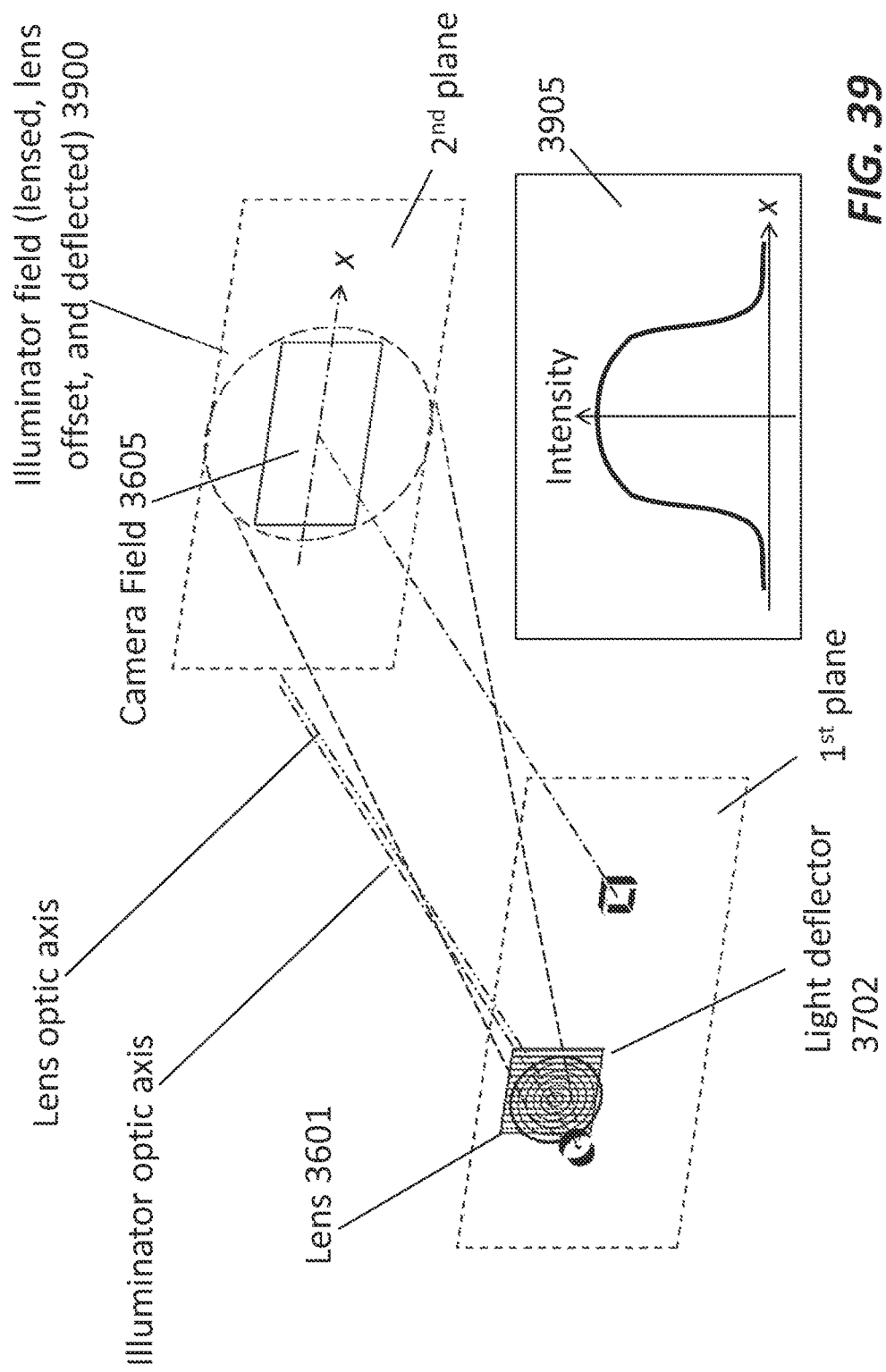
FIG. 39 illustrates the combined use of a light deflector and shifted lens position to generate a symmetric distribution of light in the projected illumination field.

With reference to FIG. 39, and pursuant to this invention, a first means of achieving a symmetric illuminator field 3900 is to position the illuminator field 3900 by a combination of a shifted Fresnel lens 3601 and a beam deflector 3702. For example, the lens 3601 might be shifted by half the distance needed to fully move the illuminator field 3900 to the camera field 3605, and a beam deflector 3702 that deflects through half the angle $\alpha$ can be used in combination. The ratio of deflection from the Fresnel lens shift to that from the deflector that produces the best symmetry depends on the details of the geometry and is best determined experimentally. The inset 3905 in FIG. 39 represents the resulting symmetric distribution of intensity across the illuminator field. This symmetry is desirable because it provides the same illumination on the two sides of the field and because the resulting variation of illumination intensity is less than in the asymmetric case.

Figure 40:
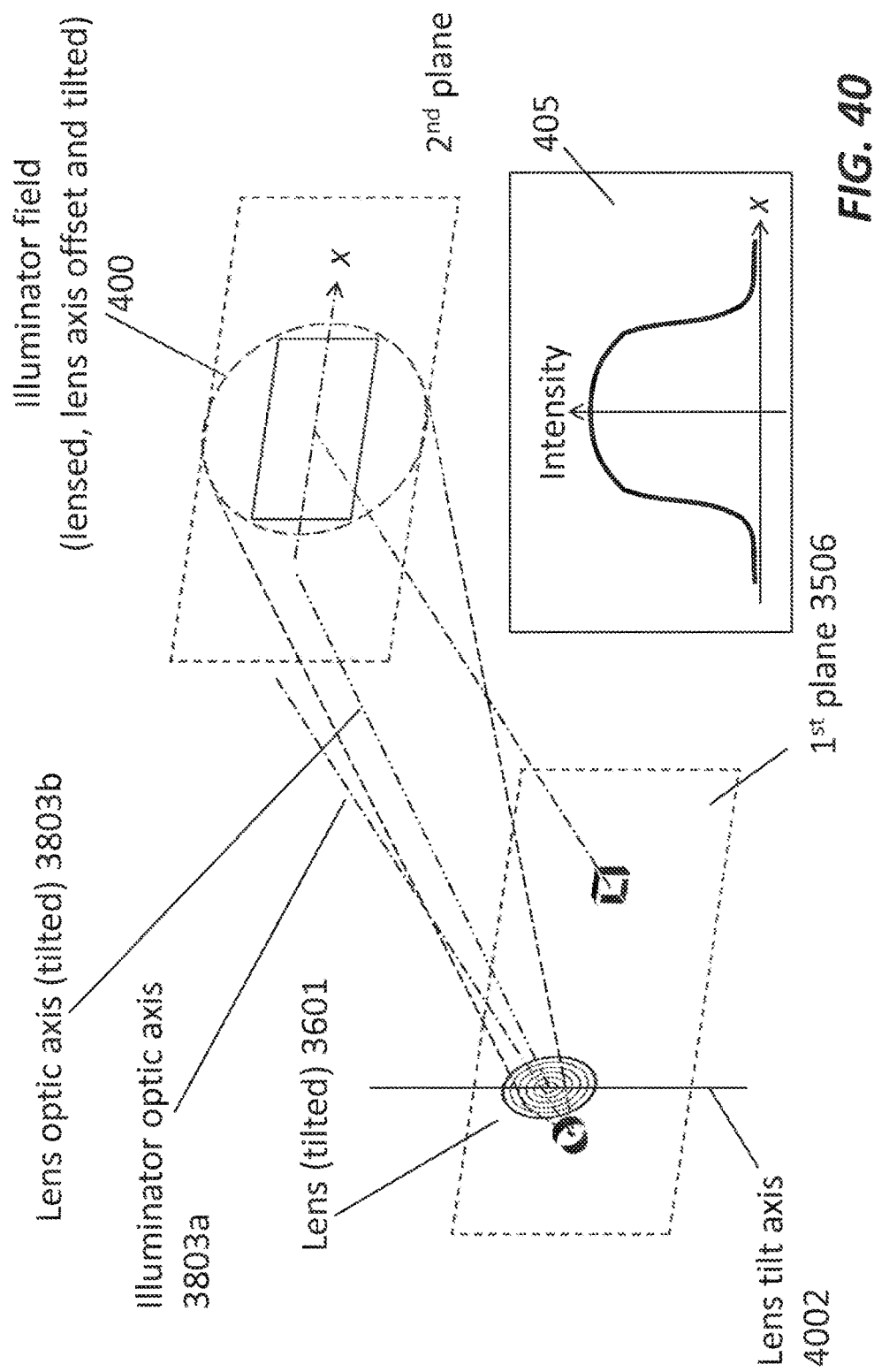
FIG. 40 illustrates tilting the lens to generate a symmetric distribution of light in the projected illumination field.

With reference to FIG. 40, and also pursuant to this invention, a second means of achieving a symmetric illuminator field 400, without requiring a beam deflector, is to tilt the Fresnel lens 3601 about an axis 4002 parallel to the 1st plane 3506 and normal to the plane of illuminator optic axis 3803a and camera optic axis 3803b. This tilt causes the near portion of the lens 3601 to move away from the LED and the far portion of the lens 3601 to move toward the LED, in turn causing the near portion of the illuminator field 400 to become more concentrated and the far portion of the illuminator field 400 to become less concentrated. An amount of rotation can be found wherein the illuminator field becomes substantially symmetric, as desired. The inset 405 in FIG. 40 represents the resulting symmetric distribution of intensity across the illuminator field. This symmetry is desirable because it provides the same illumination on the two sides of the field and because the resulting variation of illumination intensity is less than in the asymmetric case.

The amount of rotation required to form a symmetric illuminator field depends on details of the LED lensing, the thickness of the Fresnel lens, and other parameters not readily included in a simple geometric analysis. Although probably amenable to modeling by ray-tracing software, it is most practical to determine the optimum rotation angle experimentally. By way of example, a system with the camera separated from the camera field by 300 mm and with the camera separated from the LED by 109 mm, a Fresnel lens with a 15 mm focal length might be positioned at a distance of 7.5 mm above the LED substrate, offset toward the camera by a distance of 4.5 mm, and tilted toward the camera through an angle of 6°. In other systems, the rotation might be in the range of 1° to 10°. The rotation may introduce a minor shift in the position of the illuminator field, this shift being correctable if desired by a slight corresponding shift in the position of the lens.

By way of comparison, the first means of achieving a symmetric illuminator field requires two components, a lens and a deflector. Although these components may be combined into a single part by placing them on opposite sides of a single plastic sheet, these parts are typically more expensive than the lens alone. On the other hand, with this first means the lens and deflector combination can be very thin, on the order of 0.5 mm, and can be positioned very close to the LED, enabling the fabrication of a relatively thin system suitable for use in thin devices such as mobile phones and the lids of notebook PCs. The second means requires that at least a portion of the tilted lens be position at a more distant position from the LED. In practice this results in a substantially thicker assembly than can be configured using the first means. The first means is preferred when a thin system is required as a priority, while the second means is typically preferred when system thickness is not as substantial an issue as system cost.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments (e.g., of designing and/or operating transparent displays) may be implemented using hardware, software, or a combination thereof. When implemented in software, the software code can be executed on any suitable processor or collection of processors, whether provided in a single computer or distributed among multiple computers.

Further, it should be appreciated that the present displays and methods of making and operating displays may be used in conjunction with a computer, which may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices, including one or more displays as disclosed herein. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for repetitively imaging an iris, the apparatus comprising:
   a housing defining a substantially planar outer surface, a first axis normal to the substantially planar outer surface, and a curved outer surface, opposite the substantially planar outer surface, defined by a curve rotated about the first axis;
   an infrared sensor array, disposed within the housing, to acquire an infrared image of an iris via at least one first aperture in the substantially planar outer surface; and at least one infrared illuminator, disposed within the housing, to illuminate the iris during acquisition of the infrared image of the iris via at least one second aperture in the substantially planar outer surface, wherein the housing has a width W, a tipping angle $\theta_{TIP}$ between 50 and 85 degrees, and a height H=Wk/tan $\theta_{TIP}$, and wherein k is in a range of about ⅔ to about 2.5.

2. The apparatus of claim 1, wherein the width W is in a range of about 2.5 inches to about 3.75 inches, and the height H is in a range of about 0.75 inches to about 1.5 inches.

3. The apparatus of claim 1, wherein the substantially planar outer surface has a higher thermal emissivity than that of the curved outer surface.

4. The apparatus of claim 1, wherein the at least one infrared illuminator comprises:
a first infrared illuminator disposed within a first aperture formed in the housing between a diameter of the substantially planar outer surface and a circumference of the substantially planar outer surface; and
a second infrared illuminator disposed within a second aperture formed in the housing between the diameter of the substantially planar outer surface and the circumference of the substantially planar outer surface.

5. The apparatus of claim 1, wherein the apparatus has a center of gravity disposed between a centroid of the housing and the substantially planar outer surface of the device.

6. The apparatus of claim 1, further comprising:
at least one visual appearance guide, disposed on at least one of the substantially planar outer surface and the curved outer surface, to provide an indication of a desired alignment of the apparatus with respect to the iris.

7. The apparatus of claim 1, further comprising:
at least one first material, in thermal communication with the substantially planar outer surface and at least one electronic component disposed within the housing and having a first thermal conductivity, to conduct heat from the at least one electronic component to the substantially planar outer surface; and
at least one second material, in thermal communication with the curved outer surface and the at least one electronic component and having a second thermal conductivity lower than the first thermal conductivity, to conduct heat from the at least one electronic component to the curved outer surface.

8. The apparatus of claim 7, wherein:
the at least one first material defines at least one aperture, and
at least one of the infrared sensor array and the at least one infrared illuminator is disposed within the aperture.

9. A repetitive-use iris image recognition device having a bottom surface that is primarily flat and a top surface that is primarily curved and primarily rotationally symmetric about a vertical axis through the bottom surface, the repetitive-use iris image recognition device comprising:
an infra-red camera viewing the scene through the bottom surface; and
one or more infra-red illuminators illuminating the scene through the bottom surface;
wherein the top surface has an apex at a height H above the bottom surface determined by the formula $\theta_{TIP}=\tan^{-1}(W/2KH)$, where $\theta_{TIP}$ is between 50 and 85 degrees, W is a width of the repetitive-use iris image recognition device, and K is in the range of 0.2 to 0.75.

10. A repetitive-use iris image recognition device having a bottom surface that is primarily flat and a top surface that is primarily curved and primarily rotationally symmetric about a vertical axis through the bottom surface, the repetitive-use iris image recognition device comprising:
an infra-red camera viewing the scene through the bottom surface; and
one or more infra-red illuminators illuminating the scene through the bottom surface, wherein the top surface has an apex at a height H above the bottom surface in the range of about 0.75 inches to about 1.5 inches, and the one or more infra-red illuminators are positioned at or below a horizontal centerline of the repetitive-use iris image recognition device.

11. The repetitive-use iris image recognition device of claim 9, further comprising:
a center of gravity disposed at a distance from the bottom surface in the direction of an axis orthogonal to the bottom surface equal to or less than half the height of an apex of the repetitive-use iris image recognition device.

12. The repetitive-use iris image recognition device of claim 9, wherein the infra-red camera and/or the one or more infrared illuminators are disposed in one or more gaps in a heat conductivity path positioned on the bottom of the repetitive-use iris image recognition device.

* * * * *